United States Patent
Lee

(10) Patent No.: US 11,785,248 B2
(45) Date of Patent: *Oct. 10, 2023

(54) AFFINE MOTION PREDICTION-BASED IMAGE DECODING METHOD AND DEVICE USING AFFINE MERGE CANDIDATE LIST IN IMAGE CODING SYSTEM

(71) Applicant: LG ELECTRONICS INC., Seoul (KR)

(72) Inventor: Jaeho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,802

(22) Filed: Jul. 26, 2022

(65) Prior Publication Data
US 2022/0385937 A1   Dec. 1, 2022

Related U.S. Application Data

(63) Continuation of application No. 17/116,430, filed on Dec. 9, 2020, now Pat. No. 11,438,622, which is a
(Continued)

(30) Foreign Application Priority Data

Aug. 9, 2018 (KR) .................. 10-2018-0093238
Aug. 14, 2018 (KR) .................. 10-2018-0095143

(51) Int. Cl.
*H04N 19/176* (2014.01)
*H04N 19/573* (2014.01)
*H04N 19/52* (2014.01)

(52) U.S. Cl.
CPC ........... *H04N 19/52* (2014.11); *H04N 19/176* (2014.11); *H04N 19/573* (2014.11)

(58) Field of Classification Search
CPC ........................ H04N 19/52; H04N 19/176
See application file for complete search history.

(56) References Cited

U.S. PATENT DOCUMENTS 6,711,209 B1 * 3/2004 Lainema ............ H04N 19/147
375/E7.129
9,282,338 B2 * 3/2016 Zheng .................... H04N 19/40
(Continued)

FOREIGN PATENT DOCUMENTS

KR    10-2018-0061041 A    6/2018
WO       2017/156705 A1    9/2017
(Continued)

OTHER PUBLICATIONS

H. Yang, et al, "Description of Core Experiment (C): Inter prediction and motion vector coding", Joint Video Experts Team JVET of ITU-T SG 16 WP 3 and ISO/IEC JTC 1/SC 29/WG 11, 11th Meeting: Ljubljana, SI, Jul. 10-18, 2018.
(Continued)

*Primary Examiner* — Irfan Habib
(74) *Attorney, Agent, or Firm* — Bryan Cave Leighton Paisner LLP

(57) ABSTRACT

An image decoding method performed by means of a decoding device according to the present disclosure comprises the steps of: configuring an affine merge candidate list with respect to a current block; deriving CPMVs with respect to CPs of the current block on the basis of the affine merge candidate list; deriving prediction samples with respect to the current block on the basis of the CPMVs; and generating a reconstructed picture with respect to the current block on the basis of the derived prediction samples, wherein the maximum number of inherited affine candidates is two, a first inherited affine candidate is derived on the basis of a left block group of the current block, and a second
(Continued)

inherited affine candidate is derived on the basis of an upper block group of the current block.

5 Claims, 16 Drawing Sheets

Related U.S. Application Data continuation of application No. 16/822,942, filed on Mar. 18, 2020, now Pat. No. 10,893,289, which is a continuation of application No. PCT/KR2019/009950, filed on Aug. 8, 2019.

(56) References Cited

U.S. PATENT DOCUMENTS

| | | | | |
|---|---|---|---|---|
| 9,736,498 | B2* | 8/2017 | Lin | H04N 13/161 |
| 2013/0128974 | A1* | 5/2013 | Chien | H04N 19/17 |
| | | | | 375/240.15 |
| 2017/0054996 | A1* | 2/2017 | Xu | H04N 19/593 |
| 2017/0195685 | A1* | 7/2017 | Chen | H04N 19/105 |
| 2017/0214932 | A1* | 7/2017 | Huang | H04N 19/537 |
| 2017/0332095 | A1* | 11/2017 | Zou | H04N 19/124 |
| 2018/0098063 | A1* | 4/2018 | Chen | H04N 19/176 |
| 2018/0309990 | A1* | 10/2018 | Alshina | H04N 19/91 |
| 2020/0021836 | A1* | 1/2020 | Xu | H04N 19/46 |
| 2020/0036997 | A1* | 1/2020 | Li | H04N 19/139 |
| 2020/0077113 | A1* | 3/2020 | Huang | H04N 19/55 |
| 2020/0260106 | A1* | 8/2020 | Huang | H04N 19/52 |
| 2020/0260108 | A1* | 8/2020 | Chen | H04N 19/80 |

FOREIGN PATENT DOCUMENTS

| | | |
|---|---|---|
| WO | WO2017/156705 | 9/2017 |
| WO | WO2020/058958 | 3/2020 |

OTHER PUBLICATIONS

Affine transform prediction for next generation video coding, ITU, Oct. 2015 (Year: 2015).
International Search Report from PCT/KR2019/009950, dated Nov. 19, 2019.
Written Opinion of the ISA from PCT/KR2019/009950, dated Nov. 19, 2019.
U.S. Appl. No. 16/822,942, filed Mar. 18, 2020.
U.S. Appl. No. 17/116,430, filed Dec. 9, 2020.

* cited by examiner

FIG. 3
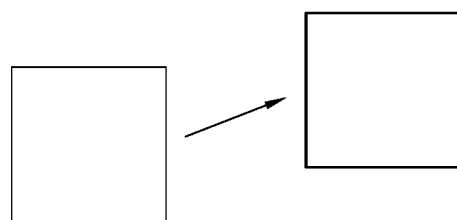
Translate
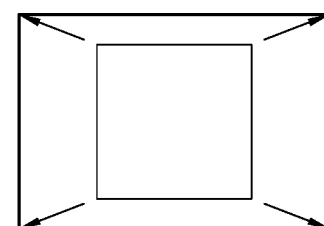
Scale
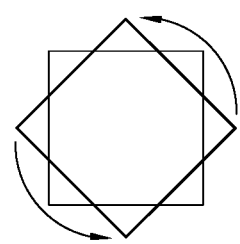
Rotate
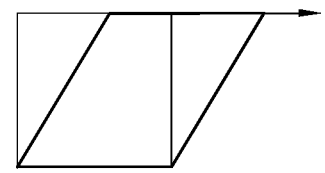
Shear

AFFINE MOTION PREDICTION-BASED IMAGE DECODING METHOD AND DEVICE USING AFFINE MERGE CANDIDATE LIST IN IMAGE CODING SYSTEM

CROSS-REFERENCE TO RELATED APPLICATIONS

This application is a Continuation of application Ser. No. 17/116,430 filed on Dec. 9, 2020, which is a Continuation of application Ser. No. 16/822,942 filed on Mar. 18, 2020, which is Continuation Bypass of International Application No. PCT/KR2019/009950, filed Aug. 8, 2019, which claims the benefit of Korean Patent Application Nos. 10-2018-0093238 filed on Aug. 9, 2018 and 10-2018-0095143 filed on Aug. 14, 2018, respectively, all of which are hereby incorporated by reference in their entirety for all purposes as if fully set forth herein.

BACKGROUND OF THE DISCLOSURE

Field of the Disclosure

The present disclosure relates a video coding technique, and more particularly, to an image decoding method and apparatus based on affine motion prediction using an affine merge candidate list in a video coding system.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

The present disclosure provides a method and apparatus for improving video coding efficiency.

The present disclosure also provides an image decoding method and apparatus for constructing an affine merge candidate list of a current block including a maximum of two inherited affine candidates and performing prediction on the current block based on the constructed affine merge candidate list.

In an aspect, an image decoding method performed by a decoding apparatus is provided. The method includes: constructing an affine merge candidate list for a current block, wherein the affine merge candidate list includes inherited affine candidates and constructed affine candidates; deriving control point motion vectors (CPMVs) for control points (CPs) of the current block based on the affine merge candidate list; deriving prediction samples for the current block based on the CPMVs; and generating a reconstructed picture for the current block based on the derived prediction samples, wherein a maximum number of the inherited affine candidates is 2, wherein a first inherited affine candidate is derived from a left block group including a bottom-left corner neighboring block and a left neighboring block, wherein a second inherited affine candidate is derived from a top block group including a top-right corner neighboring block, a top neighboring block and a top-left corner neighboring block.

In another aspect, a decoding apparatus performed video decoding is provided. The decoding apparatus includes: a predictor configured to construct an affine merge candidate list for a current block, the affine merge candidate list including inherited affine candidates and constructed affine candidates, to derive control point motion vectors (CPMVs) for control points (CPs) of the current block based on the affine merge candidate list, to derive prediction samples for the current block based on the CPMVs; and an adder configured to generate a reconstructed picture for the current block based on the derived prediction samples, wherein a maximum number of the inherited affine candidates is 2, wherein a first inherited affine candidate is derived from a left block group including a bottom-left corner neighboring block and a left neighboring block, and wherein a second inherited affine candidate is derived from a top block group including a top-right corner neighboring block, a top neighboring block and a top-left corner neighboring block.

In another aspect, an image encoding method performed by an encoding apparatus is provided. The method includes: constructing an affine merge candidate list for a current block, wherein the affine merge candidate list includes inherited affine candidates and constructed affine candidates; deriving control point motion vectors (CPMVs) for control points (CPs) of the current block based on the affine merge candidate list; and encoding image information including prediction information for the current block, wherein a maximum number of the inherited affine candidates is 2, wherein a first inherited affine candidate is derived from a left block group including a bottom-left corner neighboring block and a left neighboring block, and wherein a second inherited affine candidate is derived from a top block group including a top-right corner neighboring block, a top neighboring block and a top-left corner neighboring block.

In another aspect, a video encoding apparatus is provided. The encoding apparatus includes: a predictor configured to construct an affine merge candidate list for a current block, the affine merge candidate list including inherited affine candidates and constructed affine candidates, and to derive control point motion vectors (CPMVs) for control points (CPs) of the current block based on the affine merge candidate list; and an entropy encoder configured to encode image information including prediction information for the current block, wherein a maximum number of the inherited affine candidates is 2, wherein a first inherited affine candidate is derived from a left block group including a bottom-left corner neighboring block and a left neighboring block, and wherein a second inherited affine candidate is derived from a top block group including a top-right corner neighboring block, a top neighboring block and a top-left corner neighboring block.

According to the present disclosure, overall image/video compression efficiency may be improved.

According to the present disclosure, calculation complexity of an affine merge mode may be reduced, thereby increasing overall video coding efficiency.

According to the present disclosure, in deriving an affine merge candidate list, the maximum number of inherited affine candidates may be set to 2 and one inherited affine candidate may be derived from each of a left block group and a top block group. thereby reducing calculation complexity of the process of deriving the inherited affine candidates and the process of constructing the affine merge candidate list and enhancing coding efficiency.

BRIEF DESCRIPTION OF THE DRAWINGS

FIG. 3 illustrates a motion expressed through an affine motion model.

DESCRIPTION OF EMBODIMENTS

Figure 1:
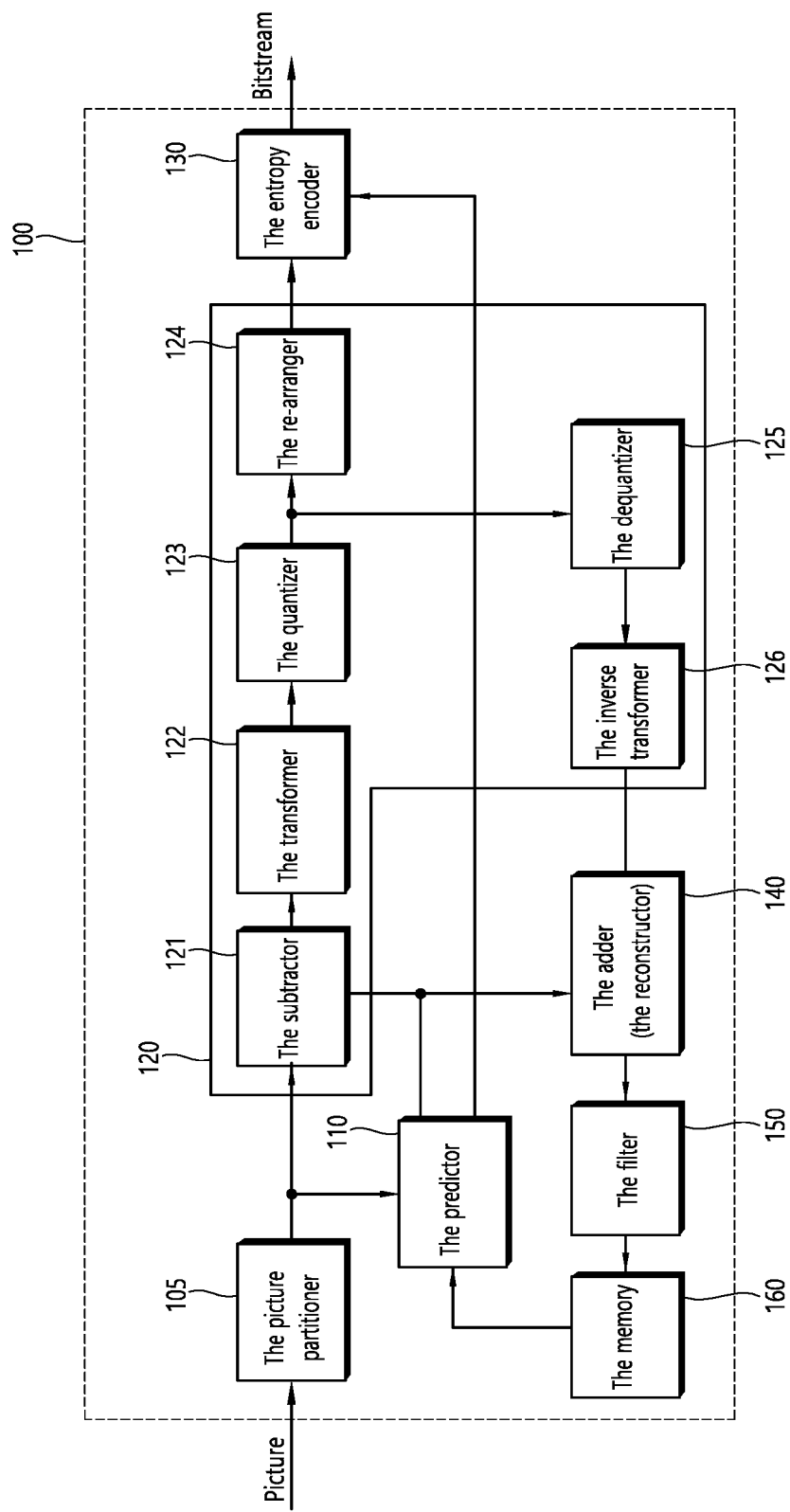
FIG. 1 is a schematic diagram illustrating a configuration of a video encoding apparatus to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

In the present disclosure, video may refer to a series of images over time. A picture generally refers to a unit representing one image in a specific time zone, and a slice is a unit constituting part of a picture in coding. One picture may include a plurality of slices or tile groups, and if necessary, the picture, slices, and tile groups may be mixed with each other and used. In this document, an image may be a still image or may represent an image of a specific time constituting video. Hereinafter, image coding may be mixed with video coding. Also, image coding may be mixed with picture coding or frame coding.

A pixel or a pal may refer to a minimum unit constituting one picture (or image). Further, a 'sample' may be used as a term corresponding to a pixel. The sample may generally represents a pixel or a value of a pixel, may represent only a pixel (a pixel value) of a luma component, and may represent only a pixel (a pixel value) of a chroma component.

A unit represents a basic unit of image processing. The unit may include at least one of a specific region of the picture and information related to the region. The unit may be used interchangeably with terms such as block or area in some cases. Alternatively, the unit may include a luma component block and a chroma component block cb and cr. In a general case, an M×N block may represent a set of samples or transform coefficients including M columns and N rows.

FIG. 1 is a diagram schematically illustrating a configuration of a video/image encoding apparatus to which the present disclosure may be applied. Hereinafter, the video encoding apparatus may include an image encoding apparatus.

Referring to FIG. 1, a video encoding apparatus 100 may include a picture partitioner 105, a predictor 110, a residual processor 120, an entropy-encoder 130, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may partition an input picture into at least one processing unit.

As an example, a processing unit may be called a coding unit (CU). In this case, the coding unit may be recursively split from the largest coding unit (LCU) according to a quad-tree binary-tree (QTBT) structure. For example, one coding unit may be divided into a plurality of coding units of a deeper depth based on a quad tree structure, a binary tree structure, and/or a ternary tree structure. In this case, for example, the quad tree structure may be applied first, and the binary tree structure and the ternary tree structure may be applied later. Alternatively, the binary tree structure/ternary tree structure may be applied first. A coding procedure according to the present disclosure may be performed based on the final coding unit which is not split any further. In this case, a maximum coding unit may be used as a final coding unit immediately based on coding efficiency according to the image characteristics or, if necessary, the coding unit may be recursively split into coding units of a deeper depth and a coding unit having an optimal size may be used as a final coding unit. Here, the coding procedure may include a procedure of prediction, transform, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor 110 may perform prediction on a processing target block (hereinafter, a current block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a colpositioned picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transformation based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy-encoder 130 may perform entropy encoding on the quantized transform coefficients. Entropy encoding may include, for example, encoding methods such as exponential Golomb, context-adaptive variable length coding (CAVLC), context-adaptive binary arithmetic coding (CABAC), and the like. The entropy-encoder 130 may encode information necessary for video reconstruction other than the quantized transform coefficients (e.g., a value of a syntax element) together or separately according to entropy encoding or a predetermined method. The encoded information may be transmitted or stored in units of network abstraction layer (NAL) in the form of a bitstream. The bitstream may be transmitted over a network or may be stored in a digital storage medium. The network may include a broadcasting network and/or a communication network, and the digital storage medium may include various storage mediums such as USB, SD, CD, DVD, Blu-ray, HDD, SSD, and the like.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
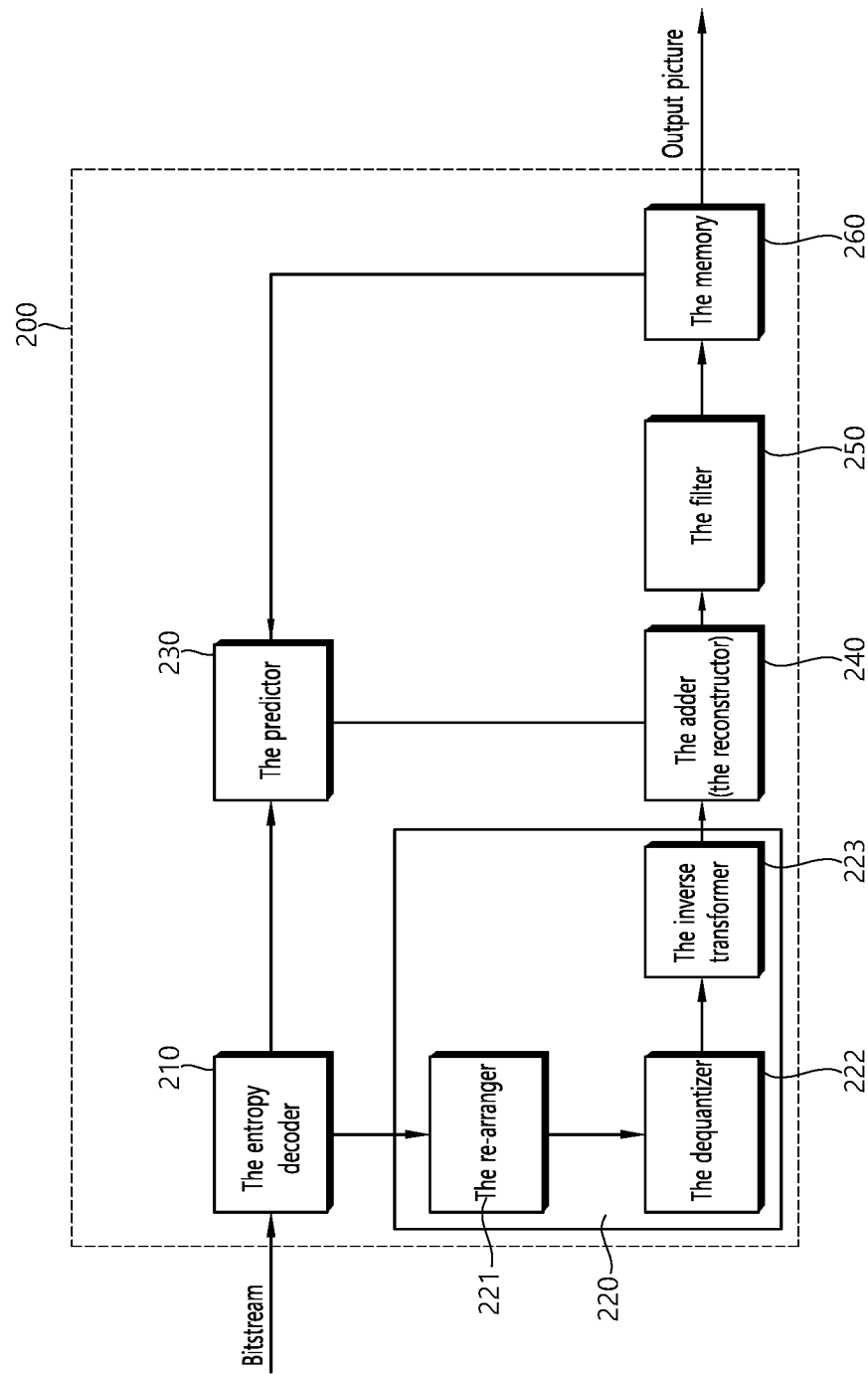
FIG. 2 is a schematic diagram illustrating a configuration of a video decoding apparatus to which the present disclosure is applicable.

FIG. 2 is a diagram schematically illustrating a configuration of a video/image decoding apparatus to which the present disclosure may be applied. Hereinafter, the video decoding apparatus may include a video decoding apparatus.

Referring to FIG. 2, the video decoding apparatus 200 may include an entropy decoder 210, a residual processor 220, a predictor 230, an adder 240, a filter 250, and a memory 260. The residual processor 22 may include a rearranger 221, a dequantizer 222, and an inverse transformer 223. In addition, although not shown, the video decoding apparatus 200 may include a receiver that receives a bitstream including video information. The receiver may be configured as a separate module or may be included in the entropy decoder 210.

When a bitstream including video/image information is input, the video decoding apparatus 200 may reconstruct a video/image/picture according to a process in which the video/image information is processed in the video encoding apparatus.

For example, the video decoding apparatus 200 may perform video decoding using a processing unit applied in the video encoding apparatus. Thus, a processing unit block of video decoding may be, for example, a coding unit, and may be, in another example, a coding unit, a prediction unit, or a transform unit. The coding unit may be split according to a quad tree structure, a binary tree structure and/or a ternary tree structure from the largest coding unit.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information on prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding apparatus. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding apparatus.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding apparatus, for example, a motion vector and information on a reference picture index may be acquired or derived based on the information on prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information on prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information on prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bitstream. That is, the MVD may be obtained by subtracting the motion vector predictor from the motion vector of the current block. Here, the predictor 230 may acquire a motion vector included in the information on prediction and derive the motion vector of the current block by adding the motion vector difference to the motion vector predictor. In addition, the predictor may obtain or derive a reference picture index indicating a reference picture from the aforementioned information on prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor or reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

Meanwhile, in the case of inter prediction, an inter prediction method considering distortion of an image has been proposed. Specifically, an affine motion model has been proposed to efficiently derive a motion vector for sub-blocks or sample points of a current block and to increase accuracy of inter prediction despite deformation of image rotation, zoom-in or zoom-out. That is, an affine motion model which derives a motion vector for sub-blocks or sample points of a current block has been proposed. Prediction using the affine motion model may be called affine inter prediction or affine motion prediction.

For example, the affine inter prediction using the affine motion model may efficiently express four motions, that is, four deformations, as described below.

FIG. 3 illustrates a motion expressed through the affine motion model. Referring to FIG. 3, a motion that may be represented through the affine motion model may include a translational motion, a scale motion, a rotational motion, and a shear motion. That is, a scale motion in which a (portion of) image is scaled according to the passage of time, a rotational motion in which a (portion of) image is rotated according to the passage of time, and a shear motion in which a (portion of) image is parallelogrammically deformed according to the passage of time, as well as the translational motion in which an (portion of) image is planarly moved according to the passage of time illustrated in FIG. 3, may be effectively represented as illustrated in FIG. 3.

The encoding apparatus/decoding apparatus may predict a distortion shape of the image based on the motion vectors at control points (CPs) of the current block through the affine inter prediction the compression performance of the image may be improved by increasing accuracy of prediction. In addition, since a motion vector for at least one control point of the current block may be derived using a motion vector of a neighboring block of the current block, a burden of a data amount on additional information may be reduced and inter prediction efficiency may be improved considerably.

As an example of the affine inter prediction, motion information at three control points, that is, three reference points, may be required.

Figure 4:
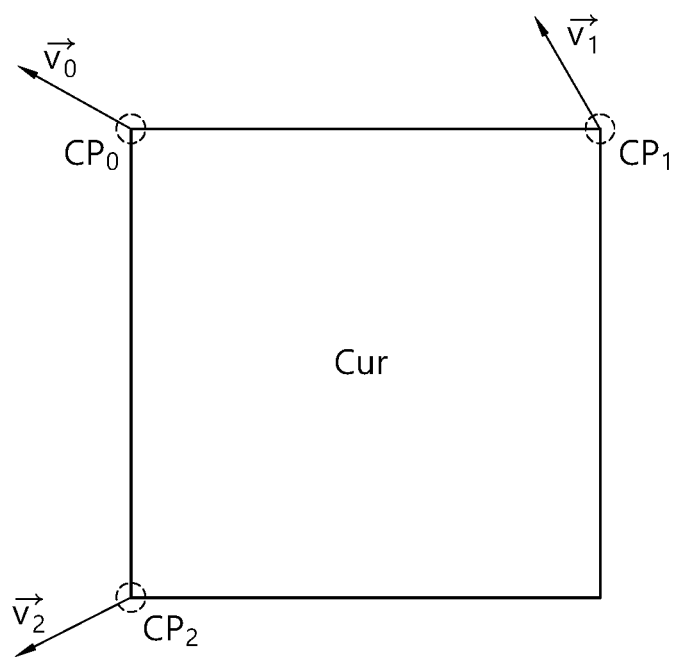
FIG. 4 illustrates the affine motion model in which motion vectors for 3 control points are used.

FIG. 4 illustrates the affine motion model in which motion vectors for three control points are used.

When a top-left sample position in a current block 400 is (0, 0), sample positions (0, 0), (w, 0), and (0, h) may be defined as the control points as shown in FIG. 4. Hereinafter, the control point of the sample position (0, 0) may be represented as a CP0, the control point of the sample position (w, 0) may be represented as a CP1, and the control point of the sample position (0, h) may be represented as a CP2.

An equation for the affine motion model may be derived using the control points and the motion vectors of the corresponding control points described above. An equation for the affine motion model may be expressed as follows.

$$\begin{cases} v_x = \frac{(v_{1x} - v_{0x})}{w} * x + \frac{(v_{2x} - v_{0x})}{h} * y + v_{0x} \\ v_y = \frac{(v_{1y} - v_{0y})}{w} * x - \frac{(v_{2y} - v_{0y})}{h} * y + v_{0y} \end{cases}$$ [Equation 1]

Here, w denotes a width of the current block 400, h denotes a height of the current block 400, $v_{0x}$ and $v_{0y}$ denote an x component and y component of the motion vector of the CP0, respectively, $v_{1x}$ and $v_{1y}$ denote an x component and a y component of the motion vector of the CP1, respectively, and $v_{2x}$ and $v_{2y}$ denote an x component and a y component of the motion vector of the CP2, respectively. In addition, x denotes an x component of a position of a target sample in the current block 400, y denotes a y component of the position of the target sample in the current block 400, $v_x$ denotes an x component of a motion vector of the target sample in the current block 400, and $v_y$ denotes a y component of the motion vector of the target sample in the current block 400.

Since the motion vector of the CP0, the motion vector of the CP1, and the motion vector of the CP2 are known, a motion vector based on the sample position in the current block may be derived based on Equation 1. That is, according to the affine motion model, the motion vectors v0($v_{0x}$, $v_{0y}$), v1($v_{1x}$, $v_{1y}$), and v2($v_{2x}$, $v_{2y}$) at the control points may be scaled based on a distance ratio between the coordinates (x, y) of the target sample and the three control points to derive the motion vectors of the target sample according to the position of the target sample. That is, according to the affine motion model, a motion vector of each sample in the current block may be derived based on the motion vectors of the control points. Meanwhile, a set of motion vectors of samples in the current block derived according to the affine motion model may be referred to as an affine motion vector field (MVF).

Meanwhile, six parameters for Equation 1 may be represented by a, b, c, d, e, and f as shown in Equation 1 below, and an equation for the affine motion model represented by the six parameters may be as follows.

$$a = \frac{(v_{1x} - v_{0x})}{w} \quad b = \frac{(v_{2x} - v_{0x})}{h} \quad c = v_{0x}$$ [Equation 2]
$$d = \frac{(v_{1y} - v_{0y})}{w} \quad e = -\frac{(v_{2y} - v_{0y})}{h} \quad f = v_{0y}$$
$$\begin{cases} v_x = a * x + b * y + c \\ v_y = d * x + e * y + f \end{cases}$$

Here, w denotes a width of the current block 400, h denotes a height of the current block 400, $v_{0x}$ and $v_{0y}$ denote the x component of the motion vector of the CP0, y components, v1x and v1y represent an x component and a y component of the motion vector of the CP1, respectively, and $v_{2x}$ and $v_{2y}$ represent the x component and the y component of the motion vector of the CP2, respectively. In addition, x denotes the x component of the position of the target sample in the current block 400, y denotes the y component of the position of the target sample in the current block 400, $v_x$ denotes the x component of the motion vector of the target sample in the current block 400, $v_y$ denotes the y component of the motion vector of the target sample in the current block 400.

The affine motion model or the affine inter prediction using the six parameters may be referred to as a 6-parameter affine motion model or AF6.

In addition, as an example of the affine inter prediction, motion information at two control points, i.e., two reference points, may be required.

Figure 5:
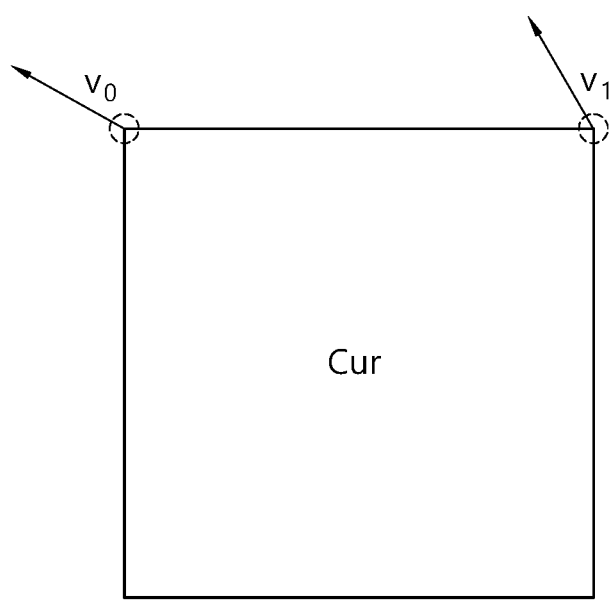
FIG. 5 illustrates an affine motion model in which motion vectors for 2 control points are used.

FIG. 5 illustrates the affine motion model in which motion vectors for two control points are used. The affine motion model using two control points may represent three motions including a translational motion, a scale motion, and a rotational motion. The affine motion model representing the three motions may be referred to as a similarity affine motion model or a simplified affine motion model.

When a top-left sample position in a current block 500 is (0, 0), sample positions (0, 0) and (w, 0) may be defined as the control points as shown in FIG. 5. Hereinafter, the control point of the sample position (0, 0) may be represented as the CP0 and the control point of the sample position (w, 0) may be represented as the CP1.

An equation for the affine motion model may be derived using the control points and the motion vectors of the corresponding control points described above. An equation for the affine motion model may be expressed as follows.

$$\begin{cases} v_x = \frac{(v_{1x} - v_{0x})}{w} * x - \frac{(v_{1y} - v_{0y})}{w} * y + v_{0x} \\ v_y = \frac{(v_{1y} - v_{0y})}{w} * x - \frac{(v_{1x} - v_{0x})}{w} * y + v_{0y} \end{cases}$$ [Equation 3]

Here, w denotes a width of the current block 500, $v_{0x}$ and $v_{0y}$ denote x and y components of the motion vector of the CP0, respectively, and $v_{1x}$ and $v_{1y}$ denote x and y components of the motion vector of the CP1. In addition, x denotes an x component of a position of a target sample in the current block 500, y denotes a y component of the position of the target sample in the current block 500, $v_x$ denotes an x component of the motion vector of the target sample in the current block 500, and $v_y$ denotes a y component of the motion vector of the target sample in the current block 500.

Meanwhile, four parameters of Equation 3 may be represented by a, b, c, and d as in the following Equation, and an equation for the affine motion model represented by the four parameters may be as follows.

$$a = \frac{(v_{1x} - v_{0x})}{w} \quad b = \frac{(v_{1y} - v_{0y})}{w} \quad c = v_{0x} \quad d = v_{0y} \quad \text{[Equation 4]}$$

$$\begin{cases} v_x = a*x - b*y + c \\ v_y = b*x + a*y + d \end{cases}$$

Here, w denotes a width of the current block 500, $v_{0x}$ and $v_{0y}$ denote x and y components of the motion vector of the CP0, respectively, and $v_{1x}$ and $v_{1y}$ denote x and y components of the motion vector of the CP1, respectively. In addition, x denotes an x component of a position of a target sample in the current block 500, y denotes a y component of the position of the target sample in the current block 500, $v_x$ denotes an x component of the motion vector of the target sample in the current block 500 and $v_y$ denotes a y component of the motion vector of the target sample in the current block 500. The affine motion model using the two control points may be represented by four parameters a, b, c, and d as shown in Equation 4, and thus, the affine motion model using the four parameters or the affine inter prediction may be referred to as a 4-parameter affine motion model or AF4. That is, according to the affine motion model, a motion vector of each sample in the current block may be derived based on the motion vectors of the control points. Meanwhile, a set of motion vectors of the samples in the current block derived according to the affine motion model may be referred to as an affine motion vector field (MVF).

Meanwhile, as described above, a motion vector of a sample unit may be derived through the affine motion model, and thus accuracy of inter prediction may be significantly improved. In this case, however, complexity in the motion compensation process may be significantly increased.

Accordingly, it may be limited such that a motion vector of a sub block unit of the current block, instead of deriving a motion vector of the sample unit, is derived.

Figure 6:
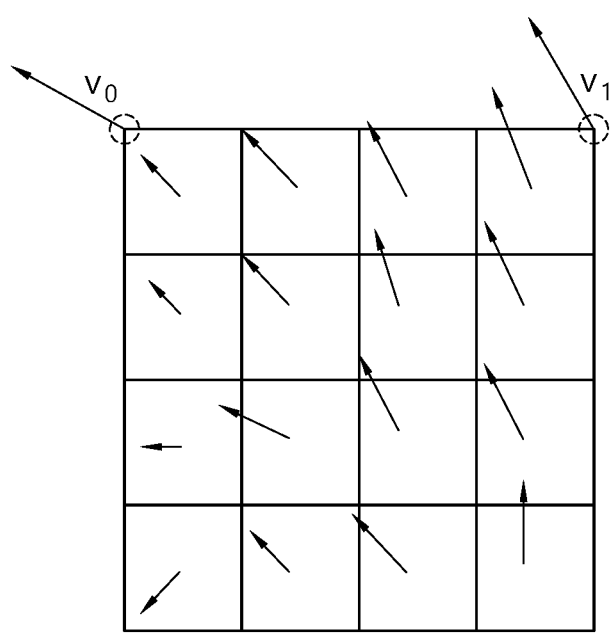
FIG. 6 illustrates a method of deriving a motion vector on a sub-block basis based on the affine motion model.

FIG. 6 illustrates a method of deriving a motion vector on a sub-block basis based on the affine motion model. FIG. 6 illustrates a case where a size of the current block is 16×16 and a motion vector is derived in units of 4×4 subblocks. The sub block may be set to various sizes. For example, when the sub block is set to n×n size (n is a positive integer, e.g., n is 4), a motion vector may be derived in units of n×n sub blocks in the current block based on the affine motion model and various methods for deriving a motion vector representing each subblock may be applied.

For example, referring to FIG. 6, a motion vector of each subblock may be derived using the center or bottom right side sample position of each subblock as a representative coordinate. Here, the center bottom right position may indicate a sample position positioned on the bottom right side among four samples positioned at the center of the sub block. For example, when n is an odd number, one sample may be positioned at the center of the sub block, and in this case, the center sample position may be used for deriving the motion vector of the sub block. However, when n is an even number, four samples may be positioned to be adjacent at the center of the subblock, and in this case, the bottom right sample position may be used to derive a motion vector. For example, referring to FIG. 6, representative coordinates of each subblock may be derived as (2, 2), (6, 2), (10, 2), . . . , (14, 14), and encoding apparatus/decoding apparatus may derive the motion vector of each subblock by substituting each of the representative coordinates of the subblocks into Equation 1 or 3 described above. The motion vectors of the subblocks in the current block derived through the affine motion model may be referred to as affine MVF.

Meanwhile, as an example, the size of the sub block in the current block may be derived based on the following equation.

$$\begin{cases} M = \text{clips3}\left(4, w, \frac{w*MvPre}{\max(\text{abs}(v_{1x} - v_{0x}), \text{abs}(v_{1y} - v_{0y}))}\right) \\ N = \text{clips3}\left(4, h, \frac{h*MvPre}{\max(\text{abs}(v_{2x} - v_{0x}), \text{abs}(v_{2y} - v_{0y}))}\right) \end{cases} \quad \text{[Equation 5]}$$

Here, M denotes a width of the sub block, and N denotes a height of the sub block. In addition, $v_{0x}$ and $v_{0y}$ denote an x component and a y component of a CPMV0 of the current block, $v_{1x}$ and $v_{1y}$ denote an x component and a y component of a CPMV1 of the current block, w denotes a width of the current block, h denotes a height of the current block, and MvPre denotes a motion vector fraction accuracy. For example, the motion vector fraction accuracy may be set to 1/16.

Meanwhile, in the inter prediction using the above-described affine motion model, that is, the affine motion prediction, may have an affine merge mode AF_MERGE and an affine inter mode AF_INTER. Here, the affine inter mode may be referred to as an affine MVP mode AF_MVP.

The affine merge mode is similar to an existing merge mode in that MVD for the motion vector of the control points is not transmitted. That is, similarly to the existing skip/merge mode, the affine merge mode may refer to an encoding/decoding method of performing prediction by deriving a CPMV for each of two or three control points from a neighboring block of the current block.

For example, when the AF_MRG mode is applied to the current block, MVs (i.e., CPMV0 and CPMV1) for the CP0 and the CP1 may be derived from the neighboring block to which the affine mode is applied among the neighboring blocks of the current block. That is, the CPMV0 and the CPMV1 of the neighboring block to which the affine mode is applied may be derived as merge candidates, and the merge candidates may be derived as the CPMV0 and the CPMV1 for the current block.

The affine inter mode may represent inter prediction of performing prediction based on an affine motion vector predictor (MVP) by deriving an MVP for a motion vector of the control points, driving a motion vector of the control points based on a motion vector difference (MOD) and the MVP, and driving an affine MVF of the current block based on the motion vector of the control points. Here, the motion vector of the control point may be represented as a control point motion vector (CPMV), the MVP of the control point may be represented as a control point motion vector predictor (CPMVP), and the MVD of the control point may be represented as a control point motion vector difference (CPMVD). Specifically, for example, the encoding apparatus may derive a control point motion vector predictor (CPMVP) and a control point motion vector (CPMV) for each of the CP0 and the CP1 (or CP0, CP1, and CP2) and transmit or store information on the CPMVP and/or the CPMVD, which is a difference between CPMVP and CPMV.

Here, when the affine inter mode is applied to the current block, the encoding apparatus/decoding apparatus may construct an affine MVP candidate list based on a neighboring block of the current block, the affine MVP candidate may be referred to as a CPMVP pair candidate, and the affine MVP candidate list may be referred to as a CPMVP candidate list.

In addition, each of the affine MVP candidates may refer to a combination of CPMVPs of CP0 and CP1 in a 4-parameter affine motion model and may refer to a combination of CPMVPs of CP0, CP1, and CP2 in a 6-parameter affine motion model.

Figure 7:
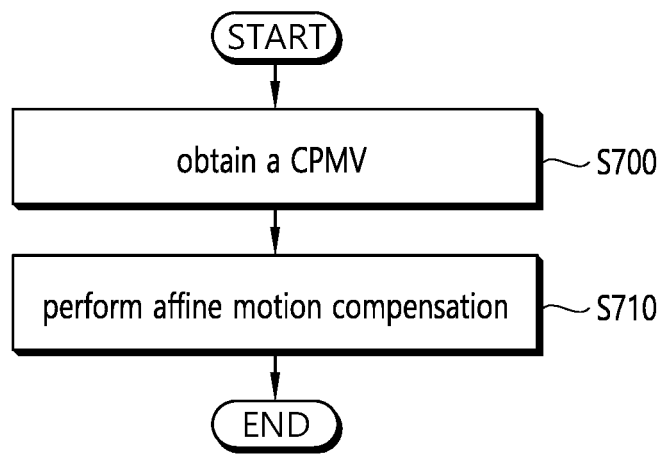
FIG. 7 is a flowchart illustrating an affine motion prediction method according to an embodiment of the present disclosure.

FIG. 7 is a flowchart illustrating an affine motion prediction method according to an embodiment of the present disclosure.

Referring to FIG. 7, the affine motion prediction method may be represented as follows. When the affine motion prediction method starts, first, a CPMV pair may be obtained (S700). Here, the CPMV pair may include CPMV0 and CPMV1 when using the 4-parameter affine model.

Thereafter, affine motion compensation may be performed based on the CPMV pair (S710), and affine motion prediction may be terminated.

In addition, there may be two affine prediction modes to determine the CPMV0 and the CPMV1. Here, the two affine prediction modes may include an affine inter mode and an affine merge mode. In the affine inter mode, the CPMV0 and the CPMV1 may be clearly determined by signaling two motion vector difference (MVD) information for the CPMV0 and the CPMV1. Meanwhile, in the affine merge mode, a CPMV pair may be derived without MVD information signaling.

In other words, in the affine merge mode, the CPMV of the current block may be derived using the CPMV of the neighboring block coded in the affine mode, and in the case of determining the motion vector in units of sub blocks, the affine merge mode may be referred to as a subblock merge mode.

In the affine merge mode, the encoding apparatus may signal, to the decoding apparatus, an index of a neighboring block coded in the affine mode for deriving the CPMV of the current block and may further signal a difference value between the CPMV of the neighboring block and the CPMV of the current block. Here, in the affine merge mode, an affine merge candidate list may be constructed based on a neighboring block, and an index of the neighboring block may represent a neighboring block to be referred to derive the CPMV of the current block on the affine merge candidate list. The affine merge candidate list may be referred to as a subblock merge candidate list.

The affine inter mode may be referred to as an affine MVP mode. In the affine MVP mode, the CPMV of the current block may be derived based on a control point motion vector predictor (CPMVP) and a control point motion vector difference (CPMVD). In other words, the encoding apparatus may determine the CPMVP for the CPMV of the current block, derive a CPMVD which is a difference between the CPMV of the current block and the CPMVP, and signal information on the CPMVP and information on the CPMVD to the decoding apparatus. Here, the affine MVP mode may construct an affine MVP candidate list based on the neighboring block, and the information on the CPMVP may represent a neighboring block to be referred to derive the CPMVP for the CPMV of the current block on the affine MVP candidate list. The affine MVP candidate list may be referred to as a control point motion vector predictor candidate list.

Meanwhile, for example, when the affine merge mode is applied to the current block, the current block may be coded as described below.

The encoding apparatus/decoding apparatus may construct an affine merge candidate list including the affine merge candidates for the current block and derive CPMVs for the CPs of the current block based on one of the affine merge candidates of the affine merge candidate list. The encoding apparatus/decoding apparatus may derive prediction samples for the current block based on the CPMVs and generate a reconstructed picture for the current block based on the derived prediction samples.

Specifically, the affine merge candidate list may be constructed as follows.

Figure 8:
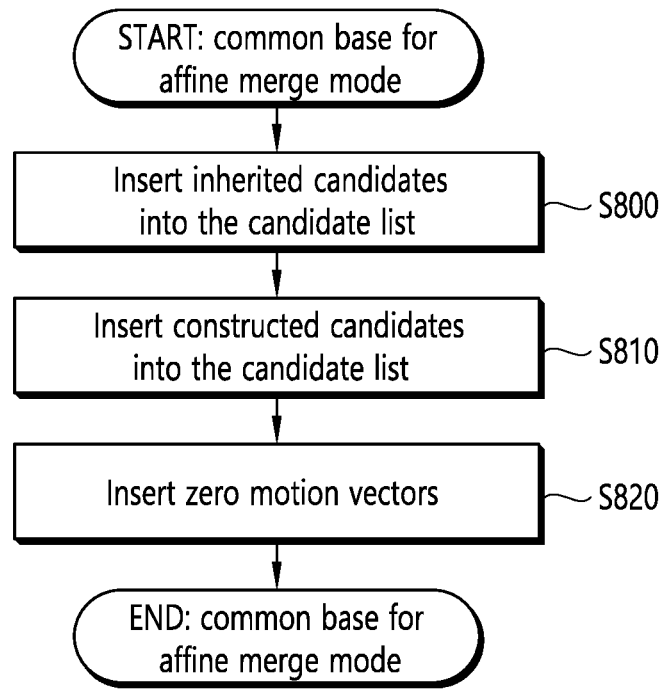
FIG. 8 shows an example of constructing an affine merge candidate list of a current block.

FIG. 8 shows an example of constructing an affine merge candidate list of a current block.

Referring to FIG. 8, the encoding apparatus/decoding apparatus may add an inherited affine candidate to the affine merge candidate list (S800).

In detail, the encoding apparatus/decoding apparatus may derive the inherited affine candidate based on the neighboring blocks of the current block. Here, the neighboring blocks may include a bottom left corner neighboring block A0, a left neighboring block A1, a top neighboring block B0, a top right corner neighboring block B1, and a top left corner neighboring block B2 of the current block.

Figure 9:
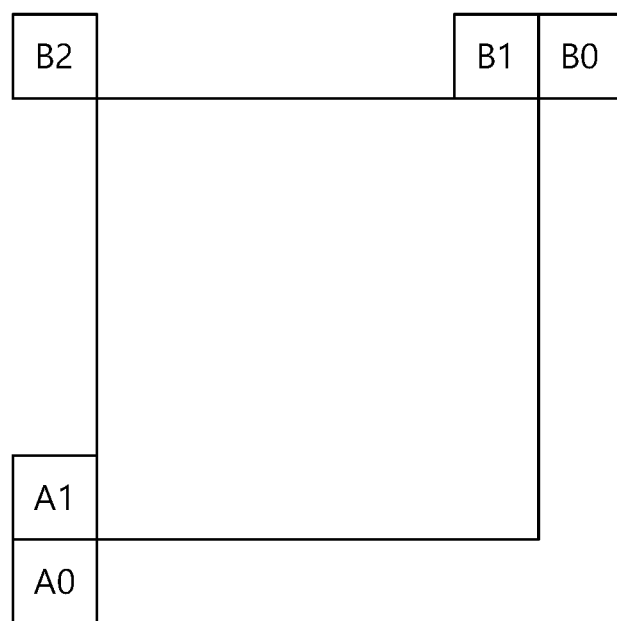
FIG. 9 illustrates neighboring blocks of the current block for deriving the inherited affine candidate.

FIG. 9 illustrates neighboring blocks of the current block for deriving the inherited affine candidate. Referring to FIG. 9, neighboring blocks of the current block include a bottom left corner neighboring block A0 of the current block, a left neighboring block A1 of the current block, a top neighboring block B0 of the current block, a top right corner neighboring block B1 of the current block, and a top left corner neighboring block B2 of the current block.

For example, when the size of the current block is W×H and an x component of a top-left sample position of the current block is 0 and a y component is 0, the left neighboring block may be a block including a sample of coordinates (−1, H−1), the top neighboring block may be a block including a sample of coordinates (W−1, −1), the top right corner neighboring block may be a block including a sample of coordinates of (W, −1), the bottom left corner neighboring block may be a block including a sample of coordinates (−1, H), and the top left corner neighboring may be a block including a sample of coordinates (−1, −1).

The inherited affine candidate may be derived based on an effective peripheral reconstructed block coded in the affine mode. For example, the encoding apparatus/decoding apparatus may sequentially check the neighboring blocks A0, A1, B0, B1 and B2, and if the neighboring blocks are coded in the affine mode (i.e., if the neighboring blocks are neighboring blocks effectively reconstructed using an affine motion model), the encoding apparatus/decoding apparatus may derive two CPMVs or three CPMVs for the current block based on the affine motion model of the neighboring blocks, and the CPMVs may be derived as inherited affine candidates of the current block. For example, a maximum of five inherited affine candidates may be added to the affine merge candidate list. That is, up to five inherited affine candidates may be derived based on the neighboring blocks.

Thereafter, the encoding apparatus/decoding apparatus may add the constructed affine candidate to the affine merge candidate list (S810).

For example, when the number of affine candidates on the affine merge candidate list is less than five, the constructed affine candidate may be added to the affine merge candidate list. The constructed affine candidate may represent an affine candidate generated by combining peripheral motion information (i.e., a motion vector and a reference picture index) of each of CPs of the current block. The motion information for each CP may be derived based on a spatial neighboring block or a temporal neighboring block for the corresponding CP. The motion information for each of the CPs may be represented as a candidate motion vector for the corresponding CP.

Figure 10:
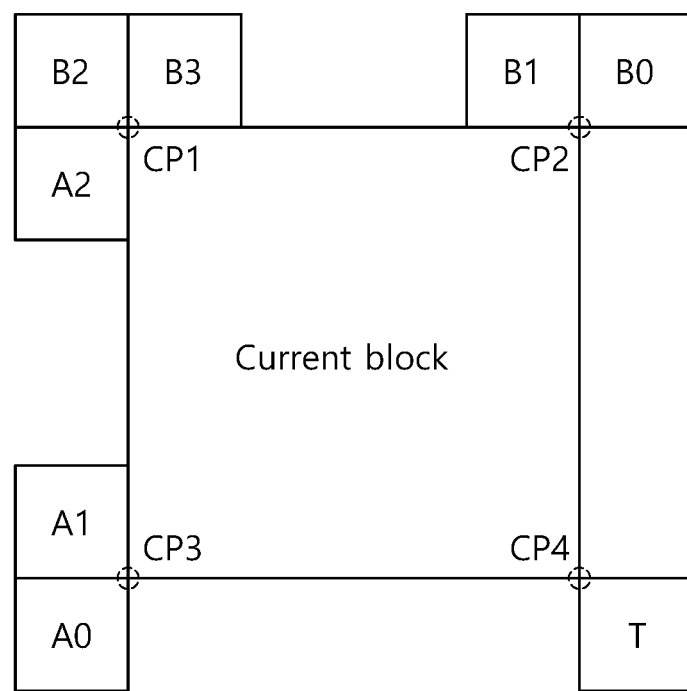
FIG. 10 illustrates neighboring blocks of the current block for deriving the constructed affine candidate.

FIG. 10 illustrates neighboring blocks of the current block for deriving the constructed affine candidate.

Referring to FIG. 10, the neighboring blocks may include spatial neighboring blocks and temporal neighboring blocks. The spatial neighboring blocks may include a neighboring block A0, a neighboring block A1, a neighboring block A2, a neighboring block B0, a neighboring block B1, a neighboring block B2, and a neighboring block B3. A neighboring block T shown in FIG. 10 may represent the temporal neighboring block.

Here, the neighboring block B2 may represent a neighboring block positioned at a top left end of the top left sample position of the current block, the neighboring block B3 may represent a neighboring block positioned at the top of the top left sample position of the current block, the neighboring block A2 may represent a neighboring block positioned at the left end of the top left sample position of the current block. In addition, the neighboring block B1 may represent a neighboring block positioned at the top of the top right sample position of the current block, and the neighboring block B0 may represent a neighboring block positioned at the top right end of the top right sample position of the current block. Also, the neighboring block A1 may represent a neighboring block positioned at the left end of the bottom left sample position of the current block, and the neighboring block A0 may represent a neighboring block positioned at the bottom left end of the bottom left sample position of the current block.

In addition, referring to FIG. 10, the CPs of the current block may include CP1, CP2, CP3, and/or CP4. The CP1 may represent the top left position of the current block, the CP2 may represent the top right position of the current block, the CP3 may represent the bottom left position of the current block, and the CP4 may represent the bottom right position of the current block. For example, when the size of the current block is W×H and an x component of the top-left sample position of the current block is 0 and a y component is 0, the CP1 may represent a position of the coordinates (0, 0), the CP2 may represent a position of coordinates (W, 0), the CP3 may represent a position of coordinates (0, H), and the CP4 may represent a position of coordinates (W, H). Meanwhile, the CP1 illustrated in FIG. 10 may represent the above-described CP0, the CP2 illustrated in FIG. 10 may represent the above-described CP1, and the CP3 illustrated in FIG. 10 may represent the above-described CP2.

A candidate motion vector for each of the aforementioned CPs may be derived as follows.

For example, the encoding apparatus/decoding apparatus may check whether neighboring blocks in a first group are available according to a first order, and derive a motion vector of an available neighboring block first identified in the checking process as a candidate motion vector for the CP1. That is, the candidate motion vector for the CP1 may be a motion vector of the available neighboring block first identified by checking the neighboring blocks in the first group in the first order. The availability may indicate that a motion vector of the neighboring block exists. That is, the available neighboring block may be a block coded by inter prediction (i.e., a block to which inter prediction is applied). Here, for example, the first group may include the neighboring block B2, the neighboring block B3, and the neighboring block A2. The first order may be an order from the neighboring block B2 in the first group to the neighboring block B3 and the neighboring block A2. For example, when the neighboring block B2 is available, the motion vector of the neighboring block B2 may be derived as a candidate motion vector for the CP1. When the neighboring block B2 is not available and the neighboring block B3 is available, the motion vector of the neighboring block B3 may be derived as a candidate motion vector for the CP1. When the neighboring block B2 and the neighboring block B3 are not available and the neighboring block A2 is available, the motion vector of the neighboring block A2 may be derived as a candidate motion vector for the CP1.

In addition, for example, the encoding apparatus/decoding apparatus may check whether neighboring blocks in a second group are available according to a second order, and derive a motion vector of an available neighboring block first identified in the checking process as a candidate motion vector for the CP2. That is, the candidate motion vector for the CP2 may be a motion vector of the available neighboring block first identified by checking the neighboring blocks in the second group in the second order. The availability may indicate that a motion vector of the neighboring block exists. That is, the available neighboring block may be a block coded by inter prediction (i.e., a block to which inter prediction is applied). Here, the second group may include the neighboring block B1 and the neighboring block B0. The second order may be an order from the neighboring block B1 in the second group to the neighboring block B0. For example, when the neighboring block B1 is available, the motion vector of the neighboring block B1 may be derived as a candidate motion vector for the CP2. When the neighboring block B1 is not available and the neighboring block B0 is available, the motion vector of the neighboring block B0 may be derived as a candidate motion vector for the CP2.

In addition, for example, the encoding apparatus/decoding apparatus may check whether neighboring blocks in a third group are available according to third order, and derive a motion vector of an available neighboring block first identified in the checking process as a candidate motion vector for the CP3. That is, the candidate motion vector for the CP3 may be a motion vector of the available neighboring block first identified by checking the neighboring blocks in the third group in the third order. The availability may indicate that a motion vector of the neighboring block exists. That is, the available neighboring block may be a block coded by inter prediction (i.e., a block to which inter prediction is applied). Here, the third group may include the neighboring block A1 and the neighboring block A0. The third order may be an order from the neighboring block A1 in the third group to the neighboring block A0. For example, when the neighboring block A1 is available, the motion vector of the neighboring block A1 may be derived as a candidate motion vector for the CP3. When the neighboring block A1 is not available and the neighboring block A0 is available, the motion vector of the neighboring block A0 may be derived as a candidate motion vector for the CP3.

Further, for example, the encoding apparatus/decoding apparatus may check whether the temporal neighboring block (i.e., the neighboring block T) is available, and when the temporal neighboring block (i.e., the neighboring block T) is available, the encoding apparatus/decoding apparatus may derive a motion vector of the temporal neighboring block (i.e., the neighboring block T) as a candidate motion vector for the CP4.

A combination of the candidate motion vector for the CP1, the candidate motion vector for the CP2, the candidate motion vector for the CP3, and/or the candidate motion vector for the CP4 may be derived as a constructed affine candidate.

For example, as described above, the six affine models require motion vectors of three CPs. Three CPs among the CP1, the CP2, the CP3, and the CP4 for the six affine models may be selected. For example, the CPs may be selected from one of {CP1, CP2, CP4}, {CP1, CP2, CP3}, {CP2, CP3, CP4}, and {CP1, CP3, CP4}. For example, the six affine models may be configured using CP1, CP2, and CP3. In this case, the CPs may be referred to as {CP1, CP2, CP3}.

In addition, for example, as described above, the 4 affine models require motion vectors of two CPs. Two CPs among the CP1, the CP2, the CP3, and the CP4 for the four affine models may be selected. For example, the CPs may be selected from one of {CP1, CP4}, {CP2, CP3}, {CP1, CP2}, {CP2, CP4}, {CP1, CP3}, and {CP3, CP4}. For example, the four affine models may be configured using CP1 and CP2. In this case, the CPs may be referred to as {CP1, CP2}.

A constructed affine candidate, which is combinations of candidate motion vectors, may be added to the affine merge candidate list in the following order. That is, after candidate motion vectors for the CPs are derived, the constructed affine candidates may be derived in the following order.

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

That is, for example, a constructed affine candidate including the candidate motion vector for CP1, the candidate motion vector for CP2, the candidate motion vector for CP3, a constructed affine candidate including the candidate motion vector for the CP1, the candidate motion vector for the CP2, and the candidate motion vector for the CP4, a constructed affine candidate including the candidate motion vector for the CP1, the candidate motion vector for the CP3, and the candidate motion vector for the CP4, a constructed affine candidate including the candidate motion vector for the CP2, the candidate motion vector for the for CP3, and the candidate motion vector for the CP4, a constructed affine candidate including the candidate motion vector for the CP1 and the candidate motion vector for the CP2, a constructed affine candidate including the candidate motion vector for the CP1 and the candidate motion vector for the CP3, a constructed affine candidate including the candidate motion vector for the CP2 and the candidate motion vector for the CP3, a constructed affine candidate including the candidate motion vector for the CP1 and the candidate motion vector for the CP4, a constructed affine candidate including the candidate motion vector for the CP2 and the candidate motion vector for the CP4, and a constructed affine candidate including the candidate motion vector for the CP3 and the candidate motion vector for the CP4 may be added to the affine merge candidate list in this order.

Thereafter, the encoding apparatus/decoding apparatus may add 0 motion vectors as an affine candidate to the affiliation merge candidate list (S820).

For example, if the number of affine candidates in the affine merge candidate list is less than five, an affine candidate including 0 motion vectors may be added to the affine merge candidate list until the affine merge candidate list includes a maximum number of affine candidates. The maximum number of affine candidates may be 5. Also, the 0 motion vector may represent a motion vector having a vector value of 0.

Meanwhile, as described above, the affine merge candidate list may be constructed, and a calculation for constructing the affine merge candidate list may be shown in the following table.

TABLE 1

| Description | Number | Detailed |
|---|---|---|
| Parameter number of motion model | 6 | |
| Length of candidate list | 5 | |
| Max number of inherited candidate | 5 | |
| Max number of constructed candidate | 10 | |
| Max number of scaling process for MV | 22 | 12 + 8 + 2 (Table 2) |
| Max number of pruning process for candidate | 50 | 1 + 2 + 3 + 4 * (5 + 10 − 4) |

Table 1 may show a calculation for an existing embodiment of deriving an affine merge candidate list. Referring to Table 1, the number of parameters of the affine motion model is 6 (i.e., six affine motion models), the number of affine candidates is 5, a maximum number of inherited affine candidates is 5, and a maximum number of constructed affine candidates may be 10. In this case, the process of scaling the motion vector may be performed up to 22 times and a pruning check process may be performed up to 50 times. Meanwhile, the pruning check process may represent a process of determining whether an affine candidate is the same as an already derived affine candidate and adding it to the affine merge candidate list only when it is not the same.

A process of scaling a motion vector in the process of deriving an affine candidate may be shown in the following table.

TABLE 2

| Process | Candidates | Number of scaling | Description |
|---|---|---|---|
| 4 parameter | Affine {CP1, CP4} Affine {CP2, CP3} Affine {CP1, CP2} Affine {CP2, CP4} Affine {CP1, CP3} Affine {CP3, CP4} | 12 = 1 * 2 * 6 | 1: Scaling is performed based on CP having a lower reference index among two CPs 2: performed on each of list0 and list1 6: performed on 6 candidates |
| 6 parameter | Affine {CP1, CP2, CP4} Affine {CP1, CP2, CP3} Affine {CP2, CP3, CP4} Affine {CP1, CP3, CP4} | 8 = 1 * 2 * 4 | 1: scaling based on CP in which two or more reference indices are generated among three CPs 2: performed on each of list0 and list1 4: performed on 4 candidates |

TABLE 2-continued

| Process | Candidates | Number of scaling | Description |
|---|---|---|---|
| TMVP | | 2 = 1 * 2 | 1: scaling on TMVP<br>2: performed on list0 and list1 |

Referring to Table 2, the number of processes for scaling a motion vector in the process of deriving an affine candidate may be derived.

In addition, comparison and division processes according to the scaling process and pruning process may be shown as the following table.

TABLE 3

| | Number of process | Number of comparison | Number of division |
|---|---|---|---|
| Scaling process of MV | 22 | 242 = 22 * 11 | 22 = 22 * 1 |
| Pruning process of candidate | 50 | 700 = 50 * 14<br>(Table 4) | 0 = 50 * 0 |

Referring to Table 3, the number of scaling processes and the number of comparison processes and division processes according to the scaling process and the number of pruning processes and the number of comparison processes and the number of division processes according to the pruning process may be derived.

In addition, the number of comparison calculations in case of comparing two affine candidates may appear as shown in the following table.

TABLE 4

| Motion model | Number of comparison | Detailed |
|---|---|---|
| 6 parameter | 14 | 12 (3 CPMVs) + 2 (reference index for list 0 and list1) |

Referring to Table 4, the number of calculations to compare two affine candidates for six affine motion models may be derived as fourteen times.

The number of pruning processes and scaling processes may indicate calculation complexity. That is, in the existing embodiment of deriving the above-described affiliate merge candidate list, a large number of comparison and division processes may be performed as shown in Table 3, and calculation complexity may be high. Therefore, an effort to reduce the number of pruning processes and scaling processes is required, and thus, the present disclosure proposes embodiments to reduce the number of pruning processes and scaling processes and reduce calculation complexity.

For example, a method of limiting a maximum number of inherited affine candidates to 1 may be proposed. That is, the affine merge candidate list may include inherited affine candidates, and a maximum number of inherited affine candidates may be 1 (maxInheritedCandNum=1).

For example, neighboring blocks may be sequentially checked and an inherited affine candidate may be derived based on the affine motion model of the first identified affine block. Thereafter, the process of deriving the inherited affine candidate is not performed, and thus, the number of comparison operations described above may be reduced and the complexity of calculation for constructing the affine merge candidate list may be reduced.

In the present embodiment, calculation for constructing the affine merge candidate list may be shown as the following table.

TABLE 5

| Description | Number | Detailed |
|---|---|---|
| Parameter number of motion model | 6 | |
| Length of candidate list | 5 | |
| Max number of inherited candidate | 1 | |
| Max number of constructed candidate | 10 | |
| Max number of scaling process for MV | 22 | 12 + 8 + 2 (Table 2) |
| Max number of pruning process for candidate | 34 | 1 + 2 + 3 + 4 * (1 + 10 − 4) |

50

Referring to Table 5, the maximum number of inherited affine candidates may be 1, and through this, a maximum number of pruning processes for the candidate configuration may be derived as 34 times. That is, the number of pruning processes may be reduced compared to the case where the maximum number of inherited affine candidates is 5.

In addition, the comparison and division processes according to the scaling process and pruning process in the present embodiment may be shown in the following table.

TABLE 6

| | Number of process | Number of comparison | Number of division |
|---|---|---|---|
| Scaling process of MV | 22 | 242 = 22 * 11 | 22 = 22 * 1 |
| Pruning process of candidate | 34 | 476 = 34 * 14<br>(Table 4) | 0 = 50 * 0 |

Referring to Table 6, the number of scaling processes and the number of comparison processes and division processes according to the scaling process and the number of pruning processes and the number of comparison processes and division processes according to the pruning process may be derived. Referring to Table 6, the maximum number of pruning processes for the candidate configuration according to the present embodiment may be 34 times and the number of comparison processes according to the pruning process may be derived as 476 times. Therefore, according to the present embodiment, the number of comparison processes according to the pruning process may be reduced compared to the existing case where the maximum number of inherited affine candidates is 5.

In another example, a method of limiting the maximum number of inherited affine candidates to 2 (maxInherited-CandNum=2) and using a scanning order of AMVP candidate derivation in the HEVC standard may be proposed. That is, for example, a method of deriving a first inherited affine candidate from the left block group and a second inherited affine candidate from the top block group may be proposed.

In detail, neighboring blocks in the left block group may be checked in a specific order, and a first inherited affine candidate may be derived based on the affine motion model of the first identified affine block. Here, the left block group may include a bottom left corner neighboring block A0 and a left neighboring block A1 of the current block, and the specific order may be an order from the bottom left corner neighboring block A0 to the left neighboring block A1.

In addition, neighboring blocks in the top block group may be checked in a specific order, and a second inherited affine candidate may be derived based on the affine motion model of the first identified affine block. Here, the top block group may include a top right corner neighboring block B0, a top neighboring block B1, and a top left corner neighboring block B2 of the current block, and the specific order may be an order from the top right corner neighboring block B0 to the top neighboring block B1 and the top left corner neighboring block B2.

In the present embodiment, although the calculation complexity is high as compared with the embodiment in which the maximum number of inherited affine candidates is limited to one, a degree thereof is small. In addition, the calculation complexity is much lower than the existing method of constructing the affine merge candidate list including the inherited affine candidates. In addition, the inherited affine candidates for each of the top region and the left region of the current block may be considered, and thus performance degradation may be compensated.

For example, in the present embodiment, calculation for constructing the affine merge candidate list may be shown in the following table.

TABLE 7

| Description | Number | Detailed |
|---|---|---|
| Parameter number of motion model | 6 | |
| Length of candidate list | 5 | |
| Max number of inherited candidate | 2 | |
| Max number of constructed candidate | 10 | |
| Max number of scaling process for MV | 22 | 12 + 8 + 2 (Table 2) |
| Max number of pruning process for candidate | 38 | 1 + 2 + 3 + 4 * (2 + 10 − 4) |

Referring to Table 7, the maximum number of inherited affine candidates may be 2, and thus, the maximum number of pruning processes for the candidate configuration may be derived as 38 times. When the number of pruning processes is slightly increased (34→38) as compared to the embodiment of limiting the maximum number of inherited affine candidates to 1 described above, but the number of pruning processes may be significantly reduced as compared with the case where the maximum number of inherited affine candidates is 5.

In addition, in the present embodiment, the comparison and division processes according to the scaling process and the pruning process may be shown in the following table.

TABLE 8

| | Number of process | Number of comparison | Number of division |
|---|---|---|---|
| Scaling process of MV | 22 | 242 = 22 * 11 | 22 = 22 * 1 |
| Pruning process of candidate | 38 | 532 = 38 * 14 | 0 = 50 * 0 |

Referring to Table 8, the number of scaling processes and the number of comparison processes and division processes according to the scaling process and the number of pruning processes and the number of comparison processes and division processes according to the pruning process may be derived. Referring to Table 8, a maximum number of pruning processes for the candidate configuration according to the present embodiment may be 38 times, and the number of comparison processes according to the pruning process may be derived as 532 times. Accordingly, the number of pruning processes is slightly increased (476→532) as compared with the embodiment of limiting the maximum number of inherited affine candidates to 1 described above but number of comparison processes according to the pruning process may be significantly reduced as compared with the existing case where the maximum number of inherited affine candidates is 5.

Further, for example, a method of deriving the inherited affine candidates based on the affine block by checking the neighboring blocks in a scanning order and deriving the derived affine candidates from neighboring blocks for different reference pictures may be proposed. This embodiment is proposed in that inherited affine candidates derived based on neighboring blocks with the same reference picture are likely to be the same or similar. Here, the scanning order may be a bottom left corner neighboring block A0→top right corner neighboring block B0→left neighboring block A1→top neighboring block B1→top left corner neighboring block B2.

For example, the inherited affine candidates according to the present embodiment may be derived as shown in the following table.

TABLE 9

| Candidate | Affine prediction | Reference frame index of list0 and list1 | Description | Description |
|---|---|---|---|---|
| A0 | Yes | {0, 0} | Yes | Since A0 block is affine prediction, affine merge candidate is considered |
| B0 | Yes | {1, 0} | Yes | Since A0 block is affine prediction and affine merge candidate having the same reference frame index does not exist, affine merge candidate is considered |
| A1 | No | {0, 0} | No | Since A0 block is not affine prediction, affine merge candidate is not considered |
| B1 | Yes | {0, 0} | No | Although A0 block is affine prediction, since affine merge candidate having the same reference frame index does not exist, affine merge candidate is not considered |
| B2 | Yes | {0, 1} | Yes | Since A0 block is affine prediction and affine merge candidate having the same reference frame index does not exist, affine merge candidate is considered |

Referring to Table 9, the neighboring blocks may be checked in order of the bottom left corner neighboring block A0, the top right corner neighboring block B0, the left neighboring block A1, the top neighboring block B1, and the top left corner neighboring block B2.

Referring to Table 9, the bottom left corner neighboring block A0 may be a block to which affine prediction is applied (i.e., an affine block), and thus, an affine candidate inherited based on the bottom left corner neighboring block A0 may be derived.

Next, the top right corner neighboring block B0 may be a block to which affine prediction is applied (i.e., an affine block), and may have a reference picture index {1, 0} different from the picture index {0, 0} of the bottom left corner neighboring block A0 for the already derived inherited affine candidate. Thus, an affine candidate inherited based on the top right corner neighboring block B0 may be derived.

Next, since the left neighboring block A1 is a block to which affine prediction is not applied, that is, an affine block, an affine candidate inherited based on the left neighboring block A1 may not be derived.

Next, the top neighboring block B1 is a block to which affine prediction is applied (i.e., an affine block) but it has the same reference picture index {0, 0} as the reference picture index {0, 0} of the bottom left corner neighboring block A0 for the already derived inherited affine candidate. Therefore, an affine candidate inherited based on the top neighboring block B1 may not be derived.

Next, the top left corner neighboring block B2 may be a block to which affine prediction is applied (i.e., an affine block), and may have a reference picture index {0, 1} different from reference picture indices of the already derived inherited affine candidates. Accordingly, the affine candidate inherited based on the top left corner neighboring block B2 may be derived.

Calculation complexity of this embodiment may be as shown in the following tables.

TABLE 10

| Description | Number | Detailed |
|---|---|---|
| Parameter number of motion model | 6 | |
| Length of candidate list | 5 | |
| Max number of inherited candidate | 5 | |
| Max number of constructed candidate | 10 | |
| Max number of scaling process for MV | 22 | 12 + 8 + 2 (Table 2) |
| Max number of pruning process for candidate | 49 | 1 + 2 + 3 + 3 + 4 * (5 + 10 − 4 − 1) |

TABLE 11

| | Number of process | Number of comparison | Number of division |
|---|---|---|---|
| Scaling process of MV | 22 | 242 = 22 * 11 | 22 = 22 * 1 |
| Pruning process of inherited candidate | 9 = 1 + 2 + 3 + 3 | 18 = 9 * 2 | 0 = 50 * 0 |
| Pruning process of constructed candidate | 40 = 4 * (5 + 10 − 4 − 1) | 560 = 40 * 14 | |

TABLE 12

| Motion model | Number of comparison | Detailed |
|---|---|---|
| 6 parameter (inherited) | 2 | 2 (reference index for list 0 and list1) |
| 6 parameter (constructed) | 14 | 12 (3 CPMVs) + 2 (reference index for list 0 and list1) |

As shown in Table 12, according to the present embodiment, the number of pruning processes in the case of comparing two affine candidates may be reduced to 2 from 10 of the previous embodiment. Thus, as shown in Table 11, the number of comparison operations for deriving the inherited affine candidates may be reduced from 140 to 18 times, thereby reducing calculation complexity due to the pruning check process.

In addition, the present disclosure proposes embodiments to reduce the calculation complexity in the process of deriving a constructed affine candidate.

Meanwhile, the constructed affine candidate may be derived based on candidate motion vectors for CPs. The candidate motion vectors may be derived based on neighboring blocks.

For example, a candidate motion vector CPMV0 for CP0 of the current block, a candidate motion vector CPMV1 for CP1 of the current block, and a candidate motion vector CPMV2 for CP2 of the current block may be selected as follows.

$$CPMV_0 = \{mv_A, mv_B, mv_C\}$$

$$CPMV_1 = \{mv_D, mv_E\}$$

$$CPMV_2 = \{mv_F, mv_G\} \quad \text{[Equation 6]}$$

Here, the CP0 may represent the top left position of the current block, the CP1 may represent the top right position of the current block, and the CP2 may represent the bottom left position of the current block.

For example, the encoding apparatus/decoding apparatus may check whether neighboring blocks in a first group are available according to a first order, and derive a motion vector of an available neighboring block first identified in the checking process as a candidate motion vector for the CP0. That is, the candidate motion vector for the CP0 may be a motion vector of the available neighboring block first identified by checking the neighboring blocks in the first group in the first order. The availability may indicate that the neighboring block exists and the neighboring block is coded by inter prediction. That is, the available neighboring block may be a block coded by inter prediction (i.e., a block to which inter prediction is applied). Here, for example, the first group may include the neighboring block B2, the neighboring block B3, and the neighboring block A2. The first order may be an order from the neighboring block B2 in the first group to the neighboring block B3 and the neighboring block A2. For example, when the neighboring block B2 is available, the motion vector of the neighboring block B2 may be derived as a candidate motion vector for the CP0. When the neighboring block B2 is not available and the neighboring block B3 is available, the motion vector of the neighboring block B3 may be derived as a candidate motion vector for the CP0. When the neighboring block B2 and the neighboring block B3 are not available and the neighboring block A2 is available, the motion vector of the neighboring block A2 may be derived as a candidate motion vector for the CP0. Meanwhile, the neighboring block B2 may be referred to as a neighboring block A, the neighboring block B3 may be referred to as a neighboring block B, and the neighboring block A2 may be referred to as a neighboring block C.

In addition, for example, the encoding apparatus/decoding apparatus may check whether neighboring blocks in a second group are available according to a second order, and derive a motion vector of an available neighboring block first identified in the checking process as a candidate motion vector for the CP1. That is, the candidate motion vector for the CP1 may be a motion vector of the available neighboring block first identified by checking the neighboring blocks in the second group in the second order. The availability may indicate that the neighboring block exists and the neighboring block is coded by inter prediction. That is, the available neighboring block may be a block coded by inter prediction (i.e., a block to which inter prediction is applied). Here, the second group may include the neighboring block B1 and the neighboring block B0. The second order may be an order from the neighboring block B1 in the second group to the neighboring block B0. For example, when the neighboring block B1 is available, the motion vector of the neighboring block B1 may be derived as a candidate motion vector for the CP1. When the neighboring block B1 is not available and the neighboring block B0 is available, the motion vector of the neighboring block B0 may be derived as a candidate motion vector for the CP1. Meanwhile, the neighboring block B1 may be referred to as a neighboring block D, and the neighboring block B0 may be referred to as a neighboring block E.

In addition, for example, the encoding apparatus/decoding apparatus may check whether neighboring blocks in a third group are available according to third order, and derive a motion vector of an available neighboring block first identified in the checking process as a candidate motion vector for the CP2. That is, the candidate motion vector for the CP2 may be a motion vector of the available neighboring block first identified by checking the neighboring blocks in the third group in the third order. The availability may indicate that the neighboring block exists and the neighboring block is coded by inter prediction. That is, the available neighboring block may be a block coded by inter prediction (i.e., a block to which inter prediction is applied). Here, the third group may include the neighboring block A1 and the neighboring block A0. The third order may be an order from the neighboring block A1 in the third group to the neighboring block A0. For example, when the neighboring block A1 is available, the motion vector of the neighboring block A1 may be derived as a candidate motion vector for the CP2. When the neighboring block A1 is not available and the neighboring block A0 is available, the motion vector of the neighboring block A0 may be derived as a candidate motion vector for the CP2. Meanwhile, the neighboring block A1 may be referred to as a neighboring block F and the neighboring block A0 may be referred to as a neighboring block G.

A constructed affine candidate for the current block may be derived based on the candidate motion vector for CP0, the candidate motion vector for CP1, and the candidate motion vector for CP2. The present disclosure proposes the following embodiments to reduce calculation complexity of the process of deriving the constructed affine candidate. Meanwhile, a candidate motion vector for CP3 of the current block may not be considered. That is, the candidate motion vector for the CP3 may not be derived. Here, the CP3 may represent the bottom right position of the current block. As described above, the CP3 may be derived based on a motion vector of a temporal neighboring block (or temporal motion vector predictor (TMVP), and thus, a scaling process needs for deriving a candidate motion vector for the CP3 may need to be performed, which may be a major reason for increasing calculation complexity. Therefore, a candidate motion vector for the CP3 may not be derived.

In an embodiment of deriving the constructed affine candidate, a maximum number of the constructed affine candidates may be limited to 1 and the constructed affine candidates may be derived as a combination of candidate motion vectors for the same reference picture. For example, as described above, the encoding apparatus/decoding apparatus may check whether neighboring blocks in the first group are available according to the first order, and derive a motion vector of the available neighboring blocks first identified in the checking process, as a candidate motion vector for CP0. That is, the candidate motion vector for the CP0 may be a motion vector of the available neighboring block first identified by checking the neighboring blocks in the first group according to the first order. The first group may include the neighboring block A, the neighboring block B, and the neighboring block C. The first order may be an order from the neighboring block A to the neighboring block B and the neighboring block C in the first group. In addition, the availability may indicate that a motion vector of the neighboring block exists. That is, the availability may indicate that the neighboring block exists and the neighboring block is coded by inter prediction. The encoding apparatus/decoding apparatus may derive a reference picture of the neighboring block as a target reference picture.

Thereafter, the encoding apparatus/decoding apparatus may check whether neighboring blocks in the second group are available according to the second order, and may derive a motion vector of a neighboring block which is first identified to be available in the checking process and which has the same reference picture as the target reference picture, as a candidate motion vector for the CP1. That is, the reference picture index of the neighboring block may represent the target reference picture index. The second group may include the neighboring block D and the neighboring block E. The second order may be an order from the neighboring block D to the neighboring block E in the second group.

In addition, the encoding apparatus/decoding apparatus may check whether neighboring blocks in the third group are candidate motion vector for the CP0, the CPMV1 may represent the candidate motion vector for the CP1, and the CPMV2 may represent the candidate motion vector for the CP2.

If at least one of the candidate motion vector for the CP0, the candidate motion vector for the CP1, or the candidate motion vector for the CP2 is not available, the encoding apparatus/decoding apparatus may determine whether the candidate motion vector for the CP0 and the candidate motion vector for the CP1 are available. If the candidate motion vector for the CP0 and the candidate motion vector for the CP1 are available, that is, if the candidate motion vector for the CP0 and the candidate motion vector for the CP1 are derived, the encoding apparatus/decoding apparatus may derive {CPMV0, CPMV1} as the constructed affine candidate. That is, the constructed affine candidate may include the candidate motion vector for the CP0 and the candidate motion vector for the CP1.

If at least one of the candidate motion vector for the CP0 and the candidate motion vector for the CP1 is not available, the encoding apparatus/decoding apparatus may determine whether the candidate motion vector for the CP0 and the candidate motion vector for the CP2 are available. If the candidate motion vector for the CP0 and the candidate motion vector for the CP2 are available, that is, if the candidate motion vector for the CP0 and the candidate motion vector for the CP2 are derived, the encoding apparatus/decoding apparatus may derive {CPMV0, CPMV2} as the constructed affine candidate. That is, the constructed affine candidate may include a candidate motion vector for the CP0 and a candidate motion vector for the CP2.

When the process of deriving the constructed affine candidate described above is represented by a pseudo code, it may be derived as shown in the following table.

TABLE 13

Get available CPMV
If available CPMV = {CPMV0, CPMV1, CPMV2}, set Affine (CPMV0, CPMV1, CPMV2) as constructed candidate.
Else if available CPMV = {CPMV0, CPMV1), set Affine (CPMV0, CPMV1) as constructed candidate.
Else if available CPMV = {CPMV0, CPMV2), set Affine (CPMV0, CPMV2) as constructed candidate.

available according to the third order, and may derive a motion vector of a neighboring block which is first identified to be available in the checking process and which has the same reference picture as the target reference picture, as a candidate motion vector for the CP2. That is, the reference picture index of the neighboring block may represent the target reference picture index. The third group may include the neighboring block F and the neighboring block G. The third order may be an order from the neighboring block F to the neighboring block G in the third group.

Next, the encoding apparatus/decoding apparatus may determine whether a candidate motion vector for the CP0, a candidate motion vector for the CP1, and a candidate motion vector for the CP2 are available. When the candidate motion vector for CP0, the candidate motion vector for CP1 and the candidate motion vector for CP2 are available, that is, when the candidate motion vector for CP0, the candidate motion vector for CP1 and the candidate motion vector for CP2 are derived, the encoding apparatus/decoding apparatus may derive {CPMV0, CPMV1, CPMV2} as the constructed affine candidate. That is, the constructed affine candidate may include a candidate motion vector for the CP0, a candidate motion vector for the CP1, and a candidate motion vector for the CP2. Here, the CPMV0 may represent the Meanwhile, unlike the embodiment described above in which a combination of candidate motion vectors derived as the constructed affine candidate is considered in order of {CPMV0, CPMV1, CPMV2}, {CPMV0, CPMV1}, and {CPMV0, CPMV2}, a method of consideration in order derived based on a width and a height of the current block may also be proposed.

For example, when the width of the current block is greater than or equal to the height, the encoding apparatus/decoding apparatus may determine whether {CPMV0, CPMV1, CPMV2}, {CPMV0, CPMV1} are available in this order and derive the constructed affine candidate. Specifically, when the width of the current block is greater than or equal to the height, the encoding apparatus/decoding apparatus may determine whether the candidate motion vector for CP0, the candidate motion vector for CP1, and the candidate motion vector for CP2 are available. If the candidate motion vectors are available, the encoding apparatus/decoding apparatus may derive the constructed affine candidate including the candidate motion vector for the CP0, the candidate motion vector for the CP1, and the candidate motion vector for the CP2. If at least one of the candidate motion vectors is not available, the encoding apparatus/decoding apparatus may determine whether the candidate motion vector for CP0 and the candidate motion vector for CP1 are available, and if the candidate motion vectors are available, the encoding apparatus/decoding apparatus may derive the constructed affine candidate including the candidate motion vector for the CP0 and the candidate motion vector for the CP1. If at least one of the candidate motion vectors is not available, the encoding apparatus/decoding apparatus may not derive the constructed affine candidate.

In addition, for example, when the width of the current block is smaller than the height, the encoding apparatus/decoding apparatus may determine whether {CPMV0, CPMV1, CPMV2}, {CPMV0, CPMV2} are available in this order and derive the constructed affine candidate. Specifically, when the width of the current block is smaller than the height, the encoding apparatus/decoding apparatus may determine whether the candidate motion vector for CP0, the candidate motion vector for CP1, and the candidate motion vector for CP2 are available. If the candidate motion vectors are available, the encoding apparatus/decoding apparatus may derive the constructed affine candidate including the candidate motion vector for the CP0, the candidate motion vector for the CP1, and the candidate motion vector for the CP2. If at least one of the candidate motion vectors is not available, the encoding apparatus/decoding apparatus may determine whether the candidate motion vector for CP0 and the candidate motion vector for CP2 are available, and if the candidate motion vectors are available, the encoding apparatus/decoding apparatus may derive the constructed affine candidate including the candidate motion vector for the CP0 and the candidate motion vector for the CP2. If at least one of the candidate motion vectors is not available, the encoding apparatus/decoding apparatus may not derive the constructed affine candidate.

When the process of deriving the constructed affine candidate is represented by a pseudo code, it may be derived as shown in the following table.

TABLE 14

Get available CPMV
If available CPMV = {CPMV0, CPMV1, CPMV2}, set Affine (CPMV0, CPMV1, CPMV2) as constructed candidate.
Else if (width >= height && available CPMV = {CPMV0, CPMV1}) {
  Set Affine (CPMV0, CPMV1) as constructed candidate.
}
Else if (width < height && available CPMV = {CPMV0, CPMV2}) {
  Set Affine (CPMV0, CPMV2) as constructed candidate.
}

In the method described above, if a distance between two CPs is short, the CPMVs of the CPs are likely to be similar or the same, and thus it is highly unlikely that the constructed affine candidate including the CPMVs is derived. Therefore, this case may not be considered. Performance degradation caused by not considering the above case is small and required calculation may be reduced. Meanwhile, when two CPs are far apart from each other, the CPMVs of the CPs are likely to be different and reflect a wider range of changes. Therefore, the constructed affine candidate may be effectively derived through the method described above.

In addition, as an embodiment of deriving the constructed affine candidate, the maximum number of the constructed affine candidate may be limited to 2, and the constructed affine candidate may be derived as a combination of candidate motion vectors for the same reference picture. For example, as described above, the encoding apparatus/decoding apparatus may derive the candidate motion vector for CP0 based on the neighboring block in the first group, and generate the same reference picture as the neighboring block in the second group, may derive the candidate motion vector for CP1 based on an available neighboring block having the same reference picture as the neighboring block in the second group, and may derive the candidate motion vector for CP2 based on an available neighboring block having the same reference picture as the neighboring block in the third group.

Thereafter, the encoding apparatus/decoding apparatus may check whether {CPMV0, CPMV1, CPMV2}, {CPMV0, CPMV1}, {CPMV0, CPMV2} are available in this order, and derive up to two constructed affine candidates.

When the process of deriving the constructed affine candidate described above is represented by a pseudo code, it may be derived as shown in the following table.

TABLE 15

Get available CPMV
If available CPMV = {CPMV0, CPMV1, CPMV2}
  Set Affine (CPMV0, CPMV1, CPMV2) as constructed candidate.
If available CPMV = {CPMV0, CPMV1}
  Set Affine (CPMV0, CPMV1) as constructed candidate.
If available CPMV = {CPMV0, CPMV2} && available constructed candidate number < 2
  Set Affine (CPMV0, CPMV2) as constructed candidate.

Referring to Table 15, the encoding apparatus/decoding apparatus may determine whether the candidate motion vector for CP0, the candidate motion vector for CP1, and the candidate motion vector for CP2 are available, and when the candidate motion vectors are available, the encoding apparatus/decoding apparatus may derive a constructed affine candidate including a candidate motion vector for the CP0, a candidate motion vector for the CP1, and a candidate motion vector for the CP2. Next, the encoding apparatus/decoding apparatus may determine whether the candidate motion vector for the CP0 and the candidate motion vector for the CP1 are available, and if the candidate motion vectors are available, the encoding apparatus/decoding apparatus may derive a constructed affine candidate including the candidate motion vector for the CP0 and the candidate motion vector for CP1. Thereafter, the encoding apparatus/decoding apparatus may determine whether the number of derived constructed affine candidates is less than two and whether the candidate motion vector for CP0 and the candidate motion vector for CP2 are available. If the number of the derived construct candidates is less than two and the candidate motion vectors are available, the encoding apparatus/decoding apparatus may derive the constructed affine candidate including the candidate motion vector for the CP0 and the candidate motion vector for the CP2.

In addition, a method of deriving up to two constructed affine candidates by checking whether a combination of candidate motion vectors is available in order derived based on the width and height of the current block may be proposed.

For example, when the process of deriving the constructed affine candidate is represented by a pseudo code, it may be derived as shown in the following table.

TABLE 16

Get available CPMV
If available CPMV = {CPMV0, CPMV1, CPMV2}, set Affine (CPMV0, CPMV1, CPMV2) as constructed candidate.
If (width >= height && available CPMV = {CPMV0, CPMV1}) {

TABLE 16-continued

```
    Set Affine (CPMV0, CPMV1) as constructed candidate.
}
if (width < height && available CPMV = {CPMV0, CPMV2}) {
    Set Affine (CPMV0, CPMV2) as constructed candidate.
}
```

Referring to Table 16, the encoding apparatus/decoding apparatus may determine whether the candidate motion vector for CP0, the candidate motion vector for CP1, and the candidate motion vector for CP2 are available, and when the candidate motion vectors are available, the encoding apparatus/decoding apparatus may derive a constructed affine candidate including the candidate motion vector for the CP0, the candidate motion vector for the CP1, and the candidate motion vector for the CP2.

Next, when the width of the current block is greater than or equal to the height, the encoding apparatus/decoding apparatus may determine whether the candidate motion vector for the CP0 and the candidate motion vector for the CP1 are available, and if the candidate motion vectors are available, the encoding apparatus/decoding apparatus may derive a constructed affine candidate including the candidate motion vector for CP0 and the candidate motion vector for CP1.

Alternatively, when the width of the current block is smaller than the height, the encoding apparatus/decoding apparatus may determine whether the candidate motion vector for the CP0 and the candidate motion vector for the CP2 are available, and if the candidate motion vectors are available, the encoding apparatus/decoding apparatus may derive a constructed affine candidate including the candidate motion vector for the CP0 and the candidate motion vector for the CP2.

In addition, in an embodiment of deriving the constructed affine candidate, the maximum number of the constructed affine candidates may be limited to 3 and the constructed affine candidate may be derived as a combination of candidate motion vectors for the same reference picture. For example, as described above, the encoding apparatus/decoding apparatus may derive a candidate motion vector for CP0 based on the neighboring block in the first group, derive a candidate motion vector for CP1 based on an available neighboring block having the same reference picture as the neighboring block in the second group, and derive a candidate motion vector for CP2 based on an available neighboring block having the same reference picture as the neighboring block in the third group.

Thereafter, the encoding apparatus/decoding apparatus may check whether {CPMV0, CPMV1, CPMV2}, {CPMV0, CPMV1}, {CPMV0, CPMV2} are available in this order, and derive up to three constructed affine candidates.

When the process of deriving the constructed affine candidate described above is represented by a pseudo code, it may be derived as shown in the following table.

vector for CP0, the candidate motion vector for CP1, and the candidate motion vector for CP2 are available, and may derive a constructed affine candidate including the candidate motion vector for the CP0, the candidate motion vector for the CP1, and the candidate motion vector for the CP2 if the candidate motion vectors are available. Next, the encoding apparatus/decoding apparatus may determine whether the candidate motion vector for the CP0 and the candidate motion vector for the CP1 are available, and may derive a constructed affine vector including the candidate motion vector CP0 and the candidate motion vector for CP1 if the candidate motion vectors are available. Thereafter, the encoding apparatus/decoding apparatus may determine whether the candidate motion vector for the CP0 and the candidate motion vector for the CP2 are available, and may derive a constructed affine candidate including the candidate motion vector for the CP0 and the candidate motion vector CP2 if the candidate motion vectors are available.

In addition, an embodiment (to be described below) may be proposed as another example of deriving a constructed affine candidate.

Figure 11:
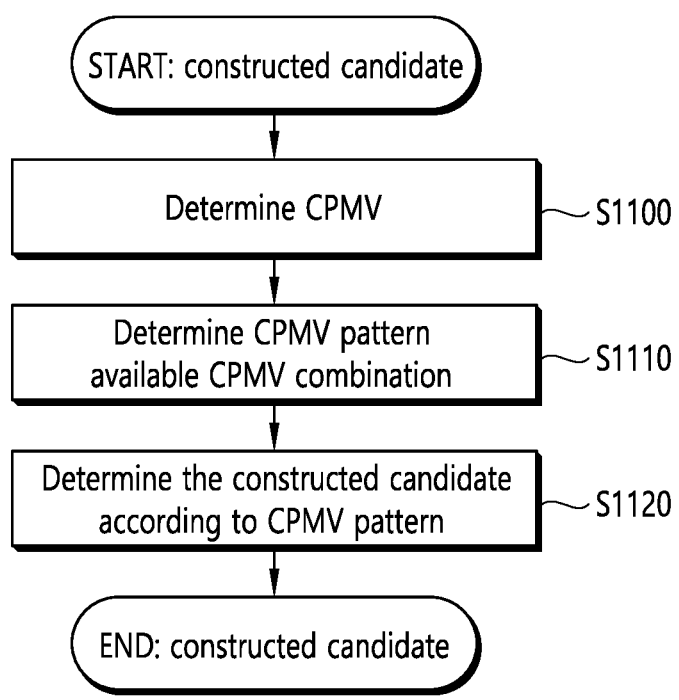
FIG. 11 shows an example of deriving a constructed affine candidate.

FIG. 11 shows an example of deriving a constructed affine candidate.

Referring to FIG. 11, the encoding apparatus/decoding apparatus derives candidate motion vectors for CPs of the current block (S1100).

For example, the encoding apparatus/decoding apparatus may check whether neighboring blocks in a first group are available according to a first order, and derive a motion vector of an available neighboring block first identified in the checking process as a candidate motion vector for the CP0. That is, the candidate motion vector for the CP0 may be a motion vector of the available neighboring block first identified by checking the neighboring blocks in the first group in the first order. The availability may indicate that the neighboring block exists and the neighboring block is coded by inter prediction. That is, the available neighboring block may be a block coded by inter prediction (i.e., a block to which inter prediction is applied). Here, for example, the first group may include the neighboring block A, the neighboring block B, and the neighboring block C. The first order may be an order from the neighboring block A in the first group to the neighboring block B and the neighboring block C. For example, when the neighboring block A is available, the motion vector of the neighboring block A may be derived as a candidate motion vector for the CP0. When the neighboring block A is not available and the neighboring block B is available, the motion vector of the neighboring block B may be derived as a candidate motion vector for the CP0. When the neighboring block A and the neighboring block B are not available and the neighboring block C is available, the motion vector of the neighboring block C may be derived as a candidate motion vector for the CP0.

In addition, for example, the encoding apparatus/decoding apparatus may check whether neighboring blocks in a second group are available according to a second order, and

TABLE 17

```
Get available CPMV
If available CPMV = {CPMV0, CPMV1, CPMV2}, set Affine (CPMV0, CPMV1, CPMV2) as
constructed candidate.
If available CPMV = {CPMV0, CPMV1}, set Affine (CPMV0, CPMV1) as constructed candidate.
If available CPMV = {CPMV0, CPMV2}, set Affine (CPMV0, CPMV2) as constructed candidate.
```

Referring to Table 17, the encoding apparatus/decoding apparatus may determine whether the candidate motion derive a motion vector of an available neighboring block first identified in the checking process as a candidate motion vector for the CP1. That is, the candidate motion vector for the CP1 may be a motion vector of the available neighboring block first identified by checking the neighboring blocks in the second group in the second order. The availability may indicate that the neighboring block exists and the neighboring block is coded by inter prediction. That is, the available neighboring block may be a block coded by inter prediction (i.e., a block to which inter prediction is applied). Here, the second group may include the neighboring block D and the neighboring block E. The second order may be an order from the neighboring block D in the second group to the neighboring block E. For example, when the neighboring block D is available, the motion vector of the neighboring block D may be derived as a candidate motion vector for the CP1. When the neighboring block D is not available and the neighboring block E is available, the motion vector of the neighboring block E may be derived as a candidate motion vector for the CP1.

In addition, for example, the encoding apparatus/decoding apparatus may check whether neighboring blocks in a third group are available according to third order, and derive a motion vector of an available neighboring block first identified in the checking process as a candidate motion vector for the CP2. That is, the candidate motion vector for the CP2 may be a motion vector of the available neighboring block first identified by checking the neighboring blocks in the third group in the third order. The availability may indicate that the neighboring block exists and the neighboring block is coded by inter prediction. That is, the available neighboring block may be a block coded by inter prediction (i.e., a block to which inter prediction is applied). Here, the third group may include the neighboring block F and the neighboring block G. The third order may be an order from the neighboring block F in the third group to the neighboring block G. For example, when the neighboring block F is available, the motion vector of the neighboring block F may be derived as a candidate motion vector for the CP2. When the neighboring block F is not available and the neighboring block G is available, the motion vector of the neighboring block G may be derived as a candidate motion vector for the CP2.

Meanwhile, a candidate motion vector for CP3 of the current block may not be considered. That is, the candidate motion vector for the CP3 may not be derived. Here, the CP3 may represent the bottom right position of the current block. As described above, the CP3 may be derived based on a motion vector of a temporal neighboring block (or temporal motion vector predictor (TMVP), and thus, a scaling process needs for deriving a candidate motion vector for the CP3 may need to be performed, which may be a major reason for increasing calculation complexity. Therefore, a candidate motion vector for the CP3 may not be derived.

The encoding apparatus/decoding apparatus may determine a CPMV pattern based on an available CPMV combination (S1110). The available CPMV combination may represent a combination of candidate motion vectors having the same reference picture.

Referring to Table 18, integer values such as "0", "1", "2", "3", and "4" may be allocated to the CPMV pattern.

For example, when a reference picture for the candidate motion vector of CP0, a reference picture for the candidate motion vector of CP1, and a reference picture for the candidate motion vector of CP2 are the same, the available CPMV combination may be represented as {CPMV0, CPMV1, CPMV2}. The CPMV pattern for the available CPMV combination {CPMV0, CPMV1, CPMV2} may be derived as CPMV pattern 1.

Further, for example, when the reference picture for the candidate motion vector of the CP0 and the reference picture for the candidate motion vector of the CP1 are the same while the reference picture for the candidate motion vector of the CP2 is different, the available CPMV combination may be represented as {CPMV0, CPMV1}. The CPMV pattern for the available CPMV combination {CPMV0, CPMV1} may be derived as CPMV pattern 2.

Further, for example, the reference picture for the candidate motion vector of the CP0 and the reference picture for the candidate motion vector of the CP2 are the same and the reference picture for the candidate motion vector of the CP1 is different, the available CPMV combination may be represented as {CPMV0, CPMV2}. The CPMV pattern for the available CPMV combination {CPMV0, CPMV2} may be derived as CPMV pattern 3.

Further, for example, when the reference picture for the candidate motion vector of the CP1 and the reference picture for the candidate motion vector of the CP2 are the same and the reference picture for the candidate motion vector of the CP0 is different, the available CPMV combination may be represented as {CPMV1, CPMV2}. The CPMV pattern for the available CPMV combination {CPMV1, CPMV2} may be derived as CPMV pattern 4.

Meanwhile, when the reference picture for the candidate motion vector of the CP1, the reference picture for the candidate motion vector of the CP1, and the reference picture for the candidate motion vector of the CP0 are all different, the CPMV pattern may be derived as CPMV pattern 0.

The encoding apparatus/decoding apparatus may derive the constructed affine candidate based on the derived CPMV pattern (S1120).

For example, when the CPMV pattern 0 is derived, the constructed affine candidate may not be derived.

In addition, for example, when the CPMV pattern 1 is derived, a constructed affine candidate including {CPMV0, CPMV1, CPMV2}, a constructed affine candidate including {CPMV0, CPMV1}, a constructed affine candidate including {CPMV0, CPMV2}, and a constructed affine candidate including {CPMV1, CPMV2} may be added to the affine merge candidate list of the current block in this order until the candidate number of the affine merge candidate list reaches a maximum number.

For example, when the CPMV pattern 2 is derived, the constructed affine candidate including {CPMV0, CPMV1} may be added to the affine merge candidate list.

In addition, for example, when the CPMV pattern 3 is derived, the constructed affine candidate including {CPMV0, CPMV2} may be added to the affine merge candidate list.

For example, when the CPMV pattern 4 is derived, the constructed affine candidate including {CPMV1, CPMV2} may be added to the affine merge candidate list.

The CPMV patterns and the available constructed affine candidates based on the available CPMV combinations may be derived as shown in the following table.

TABLE 18

| CPMV pattern | Available CPMV combination | Available constructed candidate |
|---|---|---|
| 0 | 없음 | 없음 |
| 1 | {CPMV0, CPMV1, CPMV2} | Affine(CPMV0, CPMV1, CPMV2) Affine(CPMV0, CPMV1) Affine(CPMV0, CPMV2) Affine(CPMV1, CPMV2) |

TABLE 18-continued

| CPMV pattern | Available CPMV combination | Available constructed candidate |
|---|---|---|
| 2 | {CPMV0, CPMV1} | Affine(CPMV0, CPMV1) |
| 3 | {CPMV0, CPMV2} | Affine(CPMV0, CPMV2) |
| 4 | {CPMV1, CPMV2} | Affine(CPMV1, CPMV2) |

When the process of deriving the constructed affine candidate described above is represented by a pseudo code, it may be derived as shown in the following table.

TABLE 19

```
Determine CPMV
Determine CPMV pattern available CPMV combination.
If CPMV pattern == 0
    Insert nothing into the affine merge candidate list.
Else if CPMV pattern == 1
    Insert Affine(CPMV0, CPMV1, CPMV2), Affine(CPMV0,
        CPMV1), Affine(CPMV0, CPMV2), Affine(CPMV1,
        CPMV2) sequentially into the affine merge candidate list
        until the number of candidate list is max,
Else if CPMV pattern == 2
    Insert Affine(CPMV0, CPMV1) into the affine merge candidate list
Else if CPMV pattern == 3
    Insert Affine(CPMV0, CPMV2) into the affine merge candidate list
Else if CPMV pattern == 4
    Insert Affine(CPMV1, CPMV2) into the affine merqe candidate list
```

In addition, calculation complexity of the present embodiment may appear as shown in the following tables.

TABLE 20

| Description | Number | Detailed |
|---|---|---|
| Parameter number of motion model | 6 | |
| Length of candidate list | 5 | |
| Max number of inherited candidate | 5 | |
| Max number of constructed candidate | 4 | |
| Max number of scaling process for MV | 0 | |
| Max number of pruning process for candidate | 16 | (1 + 2 + 3 + 3) + (4 + 3) |

TABLE 21

| Candidate type | Number of process | Number of comparison | Number of division |
|---|---|---|---|
| Pruning process of inherited candidate | 9 = 1 + 2 + 3 + 3 | 18 = 9 * 2 | 0 = 50 * 0 |
| Pruning process of constructed candidate | 7 = 4 + 3 | 68 = 14 * 4 + 4 * 3 | |

TABLE 22

| Motion model | Number of comparison | Detailed |
|---|---|---|
| 6 parameter (inherited) | 2 | 2 (reference index for list 0 and list1) |
| 6 parameter (constructed 와 inherited 의 비교) | 14 | 12 (3 CPMVs) + 2 (reference index for list 0 and list1) |

TABLE 22-continued

| Motion model | Number of comparison | Detailed |
|---|---|---|
| 6 parameter (constructed 와 constructed 의 비교) | 4 | 4 (1 CPMV) |

TABLE 23

| Affine merge type | Process | | Operation | |
|---|---|---|---|---|
| | Pruning | Scaling | Comparison | Division |
| Inherited | 9 | 0 | 18 | 0 |
| Constructed | 7 | 0 | 68 | 0 |

In the embodiment described above, a worst case having the highest calculation complexity may be a case where the CPMV pattern is derived as the CPMV pattern 1, and in this case, the maximum number of constructed affine candidates may be 4. In addition, in the embodiment described above, the pruning check process may include a case of comparing inherited affine candidates and a case of comparing inherited affine candidates and constructed candidates. Referring to Table 20, the maximum number of pruning check processes may be 16 times.

In addition, the number of comparison operations in the case of comparing two inherited affine candidates as shown in Table 22 may be 2, and the number of comparison operations in the case of comparing the inherited affine candidate and the constructed affine candidate may be 14. Therefore, as shown in Table 21, the number of comparison operations for deriving inherited affine candidates may be reduced from 140 to 18, and the number of comparison operations for deriving the constructed affine candidates may be reduced from 560 to 68. Therefore, calculation complexity due to the pruning check process may be reduced through the embodiment described above.

Meanwhile, an embodiment in which the CPMV pattern or the number of constructed construct candidates available according to the CPMV pattern is reduced may be proposed in the embodiment of constructing the constructed affine candidate described above.

As an example, a method of not considering a combination including CPMV0 and CPMV2 and a combination including CPMV1 and CPMV2 may be proposed.

That is, the encoding apparatus/decoding apparatus may determine the CPMV pattern based on the available CPMV combination, and the CPMV pattern may be one of the CPMV pattern 0, the CPMV pattern 1, and the CPMV pattern 2. In addition, the available constructed candidates may not include the constructed affine candidate including {CPMV0, CPMV2} and the constructed affine candidate including {CPMV1, CPMV2}.

In this embodiment, the CPMV patterns and the available constructed affine candidates based on the available CPMV combinations may be derived as shown in the following table.

TABLE 24

| CPMV pattern | Available CPMV combination | Available constructed candidate |
|---|---|---|
| 0 | 없음 | 없음. |
| 1 | {CPMV0, CPMV1, CPMV2} | Affine(CPMV0, CPMV1, CPMV2) |
|   |   | Affine(CPMV0, CPMV1) |
| 2 | {CPMV0, CPMV1} | Affine(CPMV0, CPMV1) |

In the case of 4 affine motion model, CPMV0 and CPMV1 are used, and in the case of 6 affine motion model, CPMV0, CPMV1 and CPMV2 are used, and thus, a method of deriving the constructed affine candidates as in the embodiment described above in terms of unification may be considered.

Alternatively, as an example, a method not considering the combination including CPMV1 and CPMV2 may be proposed.

That is, the encoding apparatus/decoding apparatus may determine a CPMV pattern based on the available CPMV combination, and the CPMV pattern may be one of the CPMV pattern 0, the CPMV pattern 1, the CPMV pattern 2, or the CPMV pattern 3. Also, the available constructed affine candidates may not include the constructed affine candidate including {CPMV1, CPMV2}.

In the present embodiment, the CPMV patterns and the available constructed affine candidates based on the available CPMV combinations may be derived as shown in the following table.

TABLE 25

| CPMV pattern | Available CPMV combination | Available constructed candidate |
|---|---|---|
| 0 | 없음 | 없음. |
| 1 | {CPMV0, CPMV1, CPMV2} | Affine(CPMV0, CPMV1, CPMV2) |
|   |   | Affine(CPMV0, CPMV1) |
|   |   | Affine(CPMV0, CPMV2) |
| 2 | {CPMV0, CPMV1} | Affine(CPMV0, CPMV1) |
| 3 | {CPMV0, CPMV2} | Affine(CPMV0, CPMV2) |

Affine prediction of an affine motion model using CPMV0 and CPMV2 may be considered, and thus, the embodiment described above may be proposed.

Alternatively, as an example, a method of considering all the candidate motion vector combinations described above and limiting the available constructed affine candidate according to the CPMV patterns to one may be proposed.

That is, when CPMV pattern 1 is derived as the CPMV pattern for the current block, the encoding apparatus/decoding apparatus may derive the constructed affine candidate including {CPMV0, CPMV1, CPMV2} and add the constructed affine candidate to the candidate merge candidate list.

In the present embodiment, the CPMV patterns and the available constructed affine candidates based on the available CPMV combinations may be derived as shown in the following table.

TABLE 26

| CPMV pattern | Available CPMV combination | Available constructed candidate |
|---|---|---|
| 0 | 없음 | 없음. |
| 1 | {CPMV0, CPMV1, CPMV2} | Affine(CPMV0, CPMV1, CPMV2) |
| 2 | {CPMV0, CPMV1} | Affine(CPMV0, CPMV1) |

TABLE 26-continued

| CPMV pattern | Available CPMV combination | Available constructed candidate |
|---|---|---|
| 3 | {CPMV0, CPMV2} | Affine(CPMV0, CPMV2) |
| 4 | {CPMV1, CPMV2} | Affine(CPMV1, CPMV2) |

Alternatively, for example, a method of limiting the available constructed affine candidates based on the CPMV patterns to one without considering the combination including CPMV0 and CPMV2 and the combination including CPMV1 and CPMV2 may be proposed.

That is, the encoding apparatus/decoding apparatus may determine the CPMV pattern based on the available CPMV combination, and the CPMV pattern may be one of the CPMV pattern 0, the CPMV pattern 1, and the CPMV pattern 2. In addition, the available constructed affine candidates may not include the constructed affine candidate including {CPMV0, CPMV2} and the constructed affine candidate including {CPMV1, CPMV2}. In addition, when CPMV pattern 1 is derived as the CPMV pattern for the current block, the encoding apparatus/decoding apparatus may derive a constructed affine candidate including {CPMV0, CPMV1, CPMV2} and add the constructed affine candidate to the affine merge candidate list.

In the present embodiment, the CPMV patterns and the available constructed affine candidates based on the available CPMV combinations may be derived as shown in the following table.

TABLE 27

| CPMV pattern | Available CPMV combination | Available constructed candidate |
|---|---|---|
| 0 | 없음 | 없음. |
| 1 | {CPMV0, CPMV1, CPMV2} | Affine(CPMV0, CPMV1, CPMV2) |
| 2 | {CPMV0, CPMV1} | Affine(CPMV0, CPMV1) |

Alternatively, as an example, a method of limiting the available constructed affine candidates based on the CPMV patterns to one without considering a combination including CPMV1 and CPMV2 may be proposed.

That is, the encoding apparatus/decoding apparatus determines the CPMV pattern based on the available CPMV combination, and the CPMV pattern may be one of the CPMV pattern 0, the CPMV pattern 1, the CPMV pattern 2, or the CPMV pattern 3. Also, the available constructed affine candidates may not include constructed affine candidates including {CPMV1, CPMV2}. In addition, when CPMV pattern 1 is derived as the CPMV pattern for the current block, the encoding apparatus/decoding apparatus may derive a constructed affine candidate including {CPMV0, CPMV1, CPMV2} and add the constructed affine candidate to the affine merge candidate list.

In the present embodiment, the CPMV patterns and the available constructed affine candidates based on the available CPMV combinations may be derived as shown in the following table.

TABLE 28

| CPMV pattern | Available CPMV combination | Available constructed candidate |
|---|---|---|
| 0 | 없음 | 없음 |
| 1 | {CPMV0, CPMV1, CPMV2} | Affine(CPMV0, CPMV1, CPMV2) |
| 2 | {CPMV0, CPMV1} | Affine(CPMV0, CPMV1) |
| 3 | {CPMV0, CPMV2} | Affine(CPMV0, CPMV2) |

Meanwhile, after the process of deriving the inherited affine candidate and the process of deriving the constructed affine candidate are performed, if the number of valid affine candidates of the affine merge candidate list is greater than the maximum candidate number, a zero candidate may be added to the affine merge candidate list until the affine merge candidate list includes the maximum number of candidates. The zero candidate may be defined as a candidate including 0 motion vector and a reference picture index. Here, the 0 motion vector may represent a motion vector having a vector value of 0.

The reference picture index may include a reference picture index for reference picture list 0 (list 0, L0) and a reference picture index for reference picture list 1 (list 1, L1). In this case, the zero candidates may be derived in the order shown in the following table.

TABLE 29

| Priority order | Reference index of list0 & list1 | Detailed |
|---|---|---|
| 1 | {0, 0} | |
| 2 | {0, 1} | |
| 3 | {1, 0} | |
| 4 | {1, 1} | |

For example, referring to Table 29, a reference picture index may be added to the affine merge candidate list in order of the smaller zero candidates. Specifically, when the affine merge candidate list includes one smaller affine candidates than the maximum candidate number, a zero candidate having a priority of 1 (i.e., an L0 reference picture index having a value of 0 and L1 reference picture index having a value of 0) may be added to the affine merge candidate list. In addition, when the affine merge candidate list includes two smaller candidates than the maximum candidate number, a zero candidate having a priority of 1 (i.e., L0 reference picture index having a value of 0 and L1 reference picture index having a value of 0) and a zero candidate having a priority of 2 (i.e., L0 reference picture index having a value of 0 and L1 reference picture index having a value of 1) may be added to the affine merge candidate list. Also, when the affine merge candidate list includes three smaller candidates than the maximum candidate number, a zero candidate having a priority of 1 (i.e., L0 reference picture index having a value of 0 and L1 reference picture index having a value of 0), a zero candidate having a priority of 2 (i.e., L0 reference picture index having a value of 0 and L1 reference picture index having a value of 1), and a zero candidate having a priority of 3 (i.e., L0 reference picture index having a value of 1 and L1 reference picture index having a value of 0) may be added to the affine merge candidate list. In addition, when the affine merge candidate list includes four smaller candidates than the maximum candidate number, a zero candidate having a priority of 1 (i.e., L0 reference picture index having a value of 0 and L1 reference picture index having a value of 0), a zero candidate having a priority of 2 (i.e., L0 reference picture index having a value of 0 and L1 reference picture index having a value of 1), a zero candidate having a priority of 3 (i.e., L0 reference picture index having a value of 1 and L1 reference picture index having a value of 0), and a zero candidate having a priority of 4 (i.e., L0 reference picture index having a value of 1 and L1 reference picture index having a value of 1) may be added to the affine merge candidate list.

Alternatively, as another example, zero candidates may be derived in order of most frequent occurrence of the reference picture indices of neighboring blocks of the current block, and may be added to the affine merge candidate list. That is, a zero candidate including a reference picture index that occurs frequently among the reference picture indices of the neighboring blocks may be derived as a first ranking and added to the affine merge candidate list. Thereafter, a zero candidate including a next most frequently generated reference picture index may be derived as a second ranking and added to the affine merge candidate list. Here, the neighboring blocks may include the neighboring block A, the neighboring block B, the neighboring block C, the neighboring block D, the neighboring block E, the neighboring block F, and the neighboring block G.

In another example, a zero candidate including a reference picture index of the neighboring block A1, a zero candidate including a reference picture index of the neighboring block B1, a zero candidate including the reference picture index of the neighboring block A0, a zero candidate including the reference picture index of the neighboring block B0, and a zero candidate including the reference picture index of the neighboring block B2 may be added in this order until the affine merge candidate list includes the maximum candidate number.

Figure 12:
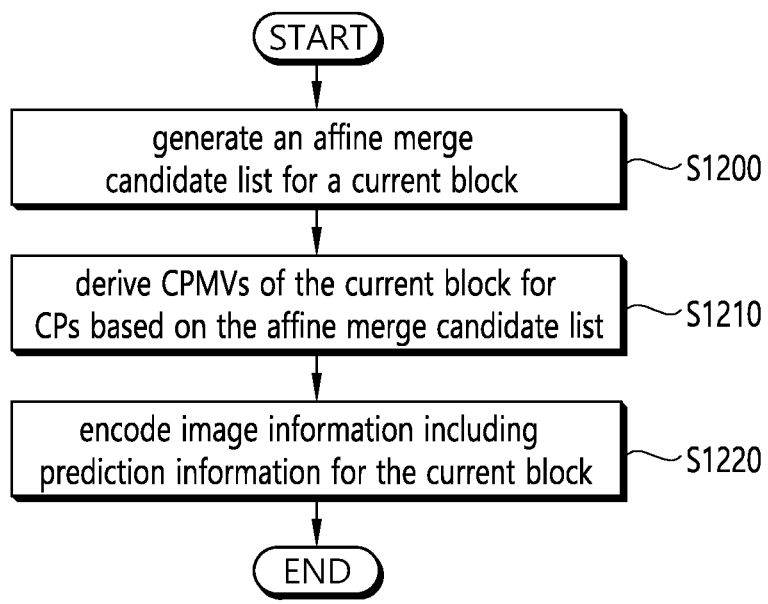
FIG. 12 schematically illustrates an image encoding method by an encoding apparatus according to the present disclosure.

FIG. 12 illustrates an image encoding method by an encoding apparatus according to the present disclosure. The method disclosed in FIG. 12 may be performed by the encoding apparatus shown in FIG. 1. Specifically, for example, steps S1200 to S1210 of FIG. 12 may be performed by the predictor of the encoding apparatus, and step S1220 may be performed by the entropy-encoder of the encoding apparatus. In addition, although not shown, a process of deriving prediction samples for the current block based on the CPMVs may be performed by the predictor of the encoding apparatus, the process of deriving a residual sample for the current block based on the original sample and the prediction sample for the current block may be performed by the subtractor of the encoding apparatus, the process of generating information on the residual for the current block based on the residual sample may be performed by the transformer of the encoding apparatus, and the process of encoding the information on the residual may be performed by the entropy-encoder of the encoding apparatus.

The encoding apparatus constructs an affiliate merge candidate list for the current block (S1200). The encoding apparatus may construct an affine merge candidate list including candidates for the current block. The candidates may include inherited affine candidates and constructed affine candidates.

For example, the inherited affine candidates may be derived based on neighboring blocks of the current block, and a maximum number of inherited affine candidates may be 2. For example, the inherited affine candidates may include a first inherited affine candidate and a second inherited affine candidate.

Specifically, the first inherited affine candidate may be derived based on a left block group including a bottom-left corner neighboring block and a left neighboring block of the current block. For example, the neighboring blocks in the left block group may be checked in a first order, and the first inherited affine candidate may be derived based on a neighboring block coded with a first checked affine motion model. Here, the first order may be an order from the bottom left corner neighboring block to the left neighboring block.

In addition, the second inherited affine candidate may be derived based on a top block group including a top-right corner neighboring block, a top neighboring block, and a top-left corner neighboring block of the current block. For example, the neighboring blocks in the top block group may be checked in a second order, and the second inherited affine candidate may be derived based on a neighboring block coded with the first checked affine motion model. Here, the second order may be an order from the top right corner neighboring block to the top neighboring block and the top left corner neighboring block.

Meanwhile, when a size is W×H and an x component of the top-left sample position of the current block is 0 and a y component thereof is 0, the bottom left corner neighboring block may be a block including a sample of coordinates (−1, H), the left neighboring block may be a block including a sample of coordinates (−1, H−1), the top right corner neighboring block may be a block including a sample of coordinates (W, −1), the top neighboring block may be a block including a sample of coordinates of (W−1, −1), and the top left corner neighboring block may be a block including a sample of coordinates (−1, −1). That is, the left neighboring block may be a left neighboring block positioned at the lowermost among the left neighboring blocks of the current block, and the top neighboring may be is a top neighboring block positioned at the leftmost among the top neighboring blocks of the current block.

Alternatively, for example, the inherited affine candidate may be derived based on a neighboring block of the current block, and the maximum number of inherited affine candidates may be 1.

Specifically, for example, the neighboring blocks may be checked in a specific order, and the inherited affine candidate may be derived based on a neighboring block coded by the first checked affine motion model. Here, the neighboring blocks may include a left neighboring block, a top neighboring block, a bottom left corner neighboring block, a top right corner neighboring block, and a top left corner neighboring block of the current block. The specific order may be an order from the left neighboring block to the top neighboring block, the bottom left corner neighboring block, the top right corner neighboring block, and the top left corner neighboring block.

Meanwhile, when the size is W×H and an x component of the top-left sample position of the current block is 0 and a y component thereof is 0, the bottom left corner neighboring block may be a block including a sample of coordinates (−1, H), the top right corner neighboring block may be a block including a sample of coordinates of (W, −1), the top neighboring block may be a block including a sample of coordinates (W−1, −1), and the top left corner neighboring block may be a block including a sample of coordinates (−1, −1). That is, the left neighboring block may be a left neighboring block positioned at the lowermost among the left neighboring blocks of the current block, and the top neighboring block may be a top neighboring block positioned at the leftmost among the top neighboring blocks of the current block.

Alternatively, for example, the inherited affine candidates may be derived based on the neighboring blocks of the current block, and reference picture indices of the inherited affine candidates may represent different reference pictures. For example, the neighboring blocks may be checked in a specific order, and a first inherited affine candidate may be derived based on the first neighboring block coded with the affine motion model. Thereafter, when the reference picture index of the second neighboring block coded with the affine motion model following the first neighboring block in the specific order represents a reference picture different from the reference picture index of the first neighboring block, a second inherited affine candidate may be derived based on the second neighboring block. If the reference picture index of the second neighboring block represents the same reference picture as the reference picture index of the first neighboring block, an inherited affine candidate may not be derived based on the second neighboring block.

In addition, as an example, the constructed affine candidates may be derived based on the neighboring blocks of the current block.

For example, candidate motion vectors for control points (CPs) of the current block may be derived based on the neighboring blocks. Here, the CPs may include CP0, CP1, CP2. The CP0 may represent a top left position of the current block, the CP1 may represent a top right position of the current block, and the CP2 may represent a bottom left position of the current block. In addition, the neighboring blocks may include a neighboring block A, a neighboring block B, a neighboring block C, a neighboring block D, a neighboring block E, a neighboring block F, and a neighboring block G of the current block. When the size of the current block is W×H and the x component of the top-left sample position of the current block is 0 and they component thereof is 0, the neighboring block A may be a block including a sample of coordinates (−1, −1), the neighboring block B may be a block including a sample of coordinates (0, −1), the neighboring block C may be a block including a sample of coordinates (−1, 0), the neighboring block D may be a block including a sample of coordinates (W−1, −1), the neighboring block E may be a block including a sample of coordinates (W, −1), the neighboring block F may be a block including a sample of coordinates (−1, H−1), and the neighboring block G may be a block including a sample of (−1, H) coordinates. That is, the neighboring block A may be a top left corner neighboring block of the current block, the neighboring block B may be a top neighboring block positioned at the leftmost among the top neighboring blocks of the current block, the neighboring block C may be a left neighboring block positioned at the uppermost among the left neighboring blocks of the current block, the neighboring block D may be a top neighboring block positioned at the rightmost among the top neighboring blocks of the current block, and the neighboring block E may be a top right corner neighboring block of the current block, the neighboring block F may be a left neighboring block positioned at the lowermost among the left neighboring blocks of the current block, and the neighboring block G may be a bottom left corner neighboring block of the current block.

Specifically, for example, the neighboring blocks in the first group may be checked in a first order, and a motion vector of a first neighboring block first identified to be available may be derived as a candidate motion vector for CP0. That is, the candidate motion vector for the CP0 may be derived as the motion vector of the first neighboring block first identified to be available by checking whether the neighboring blocks in the first group are available in the first order. The availability may indicate that the neighboring block is coded by inter prediction. That is, the available neighboring block may be a block to which inter prediction is applied. Here, for example, the first group may include the neighboring block A, the neighboring block B, and the neighboring block C. The first order may be an order from the neighboring block A to the neighboring block B and the neighboring block C in the first group. For example, when the neighboring block A is available, a motion vector of the neighboring block A may be derived as a candidate motion vector for the CP0. When the neighboring block A is not available and the neighboring block B is available, a motion vector of the neighboring block B may be derived as a candidate motion vector for the CP0. When the neighboring block A and the neighboring block B are not available and the neighboring block C is available, a motion vector of the neighboring block C may be derived as a candidate motion vector for the CP0.

In addition, for example, the neighboring blocks in the second group may be checked in a second order, and a motion vector of a second neighboring block first identified to be available may be derived as a candidate motion vector for CP1. That is, the candidate motion vector for the CP1 may be derived as the motion vector of the second neighboring block first identified to be available by checking whether the neighboring blocks in the second group are available in the second order. The availability may indicate that the neighboring block is coded by inter prediction. That is, the available neighboring block may be a block to which inter prediction is applied. Here, the second group may include the neighboring block D and the neighboring block E. The second order may be an order from the neighboring block D to the neighboring block E in the second group. For example, when the neighboring block D is available, a motion vector of the neighboring block D may be derived as a candidate motion vector for the CP1. When the neighboring block D is not available and the neighboring block E is available, a motion vector of the neighboring block E may be derived as a candidate motion vector for the CP1.

In addition, for example, the neighboring blocks in the third group may be checked in a third order, and a motion vector of a third neighboring block first identified to be available may be derived as a candidate motion vector for CP2. That is, the candidate motion vector for the CP2 may be derived as the motion vector of the third neighboring block first identified to be available by checking whether the neighboring blocks in the third group are available in the third order. The availability may indicate that the neighboring block is coded by inter prediction. That is, the available neighboring block may be a block to which inter prediction is applied. Here, the third group may include the neighboring block F and the neighboring block G. The third order may be an order from the neighboring block F to the neighboring block G in the third group. For example, when the neighboring block F is available, a motion vector of the neighboring block F may be derived as a candidate motion vector for the CP2. When the neighboring block F is not available and the neighboring block G is available, a motion vector of the neighboring block G may be derived as a candidate motion vector for the CP2.

Thereafter, the constructed affine candidates may be derived based on candidate motion vectors of the CPs.

For example, when a reference picture for the first neighboring block, a reference picture for the second neighboring block, and a reference picture for the third neighboring block are the same, the constructed affine candidates may include a first constructed affine candidate including a candidate motion vector for the CP1, a candidate motion vector for the CP2, and a candidate motion vector for the CP3. Or, for example, when the reference picture for the first neighboring block, the reference picture for the second neighboring block, and the reference picture for the third neighboring block are the same, the constructed affine candidates may be include the first constructed affine candidate and a second constructed affine candidate including the candidate motion vector for the CP0 and the candidate motion vector for the CP1. Or, for example, when the reference picture for the first neighboring block, the reference picture for the second neighboring block, and the reference picture for the third neighboring block are the same, the constructed affine candidates may be include the first constructed affine candidate, the second constructed affine candidate, and a third constructed affine candidate including the candidate motion vector for the CP0 and the candidate motion vector for the CP2. Or, for example, when the reference picture for the first neighboring block, the reference picture for the second neighboring block, and the reference picture for the third neighboring block are the same, the constructed affine candidates may be include the first constructed affine candidate, the second constructed affine candidate, the third constructed affine candidate, and a fourth constructed affine candidate including the candidate motion vector for the CP1 and the candidate motion vector for the CP2.

Further, for example, when the reference picture for the first neighboring block and the reference picture for the second neighboring block are the same, the constructed affine candidates may include the second constructed affine candidate including the candidate motion vector for the CP0 and the candidate motion vector for the CP1.

Further, for example, when the reference picture for the first neighboring block and the reference picture for the third neighboring block are the same, the constructed affine candidates may include the third constructed affine candidate including the candidate motion vector for the CP0 and the candidate motion vector for the CP2.

Further, for example, when the reference picture for the second neighboring block and the reference picture for the third neighboring block are the same, the constructed affine candidates may include the fourth constructed affine candidate including the candidate motion vector for the CP1 and the candidate motion vector for the CP2.

Meanwhile, if the number of affine candidates (i.e., inherited affine candidates and/or constructed affine candidates) derived through the above process is smaller than the maximum number of candidates, the affine merge candidate list may include a zero candidate. For example, the zero candidate may include candidate motion vectors having a value of 0 and a reference picture index.

In addition, when the number of inherited affine candidates and constructed affine candidates is smaller than the maximum candidate number of the affine merge candidate list, that is, when the number of derived candidates is smaller than the maximum number of candidates, the affine merge candidate list may include a zero candidate. The zero candidate may include candidate motion vectors having a value of zero for the CPs and a reference picture index having a value of zero. Or, for example, when the number of derived candidates is smaller than the maximum candidate number, a first zero candidate, a second zero candidate, a third zero candidate, . . . , n-th candidate may be added in this order to the affine candidate merge list until the number of affine candidates in the affine merge candidate list reaches the maximum number of candidates. For example, the first zero candidate may include candidate motion vectors having a value of 0, an L0 (list 0) reference picture index having a value of 0, and an L1 (list 1) reference picture index, the second zero candidate may include candidate motion vectors having a value of 0, an L0 reference picture index having a value of 0, and an L1 reference picture index having a value of 1, the third zero candidate may include candidate motion vectors having a value of 0, an L0 reference picture index having a value of 1, and an L1 reference picture index having a value of 0, and the fourth zero candidate may include candidate motion vectors having a value of 0, an L0 reference picture index having a value of 1, and an L1 reference picture index having a value of 1. Alternatively, for example, reference picture indices of the neighboring block A, the neighboring block B, the neighboring block C, the neighboring block D, the neighboring block E, the neighboring block F, and the neighboring block G may be included in the first zero candidate to the nth zero candidate in order of higher frequency. Alternatively, for example, the first zero candidate may include the candidate motion vectors having a value of 0 and a reference picture index having the same value as that of a reference picture index of the left neighboring block of the current block, the second zero candidate may include the candidate motion vectors having a value of 0 and a reference picture index having the same value as that of a reference picture index of the top neighboring block of the current block, the third zero candidate may include the candidate motion vectors having a value of 0 and a reference picture index having the same value as that of a reference picture index of the bottom left corner neighboring block of the current block, the fourth zero candidate may include the candidate motion vectors having a value of 0 and a reference picture index having the same value as that of a reference picture index of the top right corner neighboring block of the current block, and the fifth zero candidate may include the candidate motion vectors having a value of 0 and a reference picture index having the same value as that of a reference picture index of the top left corner neighboring block of the current block.

The encoding apparatus derives control point motion vectors (CPMVs) for control points (CPs) of the current block based on the affine merge candidate list (S1210). The encoding apparatus may derive CPMVs for the CPs of the current block having an optimal RD cost, and select an affine candidate most similar to the CPMVs among the affine candidates of the affine merge candidate list as an affine candidate for the current block. The encoding apparatus may derive control point motion vectors (CPMVs) for control points (CPs) of the current block based on the selected affine candidate among the affine candidates included in the candidate merge candidate list. Specifically, when the selected affine candidate includes a candidate motion vector for CP0 and a candidate motion vector for CP1, the candidate motion vector of the affine candidate for CP0 may be derived as the CPMV of CP0 and the candidate motion vector of the affine candidate for CP1 may be derived as the CPMV of the CP1. In addition, when the selected affine candidate includes a candidate motion vector for CP0, a candidate motion vector for CP1, and a candidate motion vector for CP2, the candidate motion vector of the affine candidate for CP0 may be derived as the CPMV of CP0, the candidate motion vector of the affine candidate for CP1 may be derived as the CPMV of the CP1, and the candidate motion vector of the affine candidate for CP2 may be derived as the CPMV of the CP2. In addition, when the selected affine candidate includes a candidate motion vector for CP0 and a candidate motion vector for CP2, the candidate motion vector of the affine candidate for CP0 may be derived as the CPMV of the CP0 and the candidate motion vector of the affine candidate for the CP2 may be derived as the CPMV of the CP2.

The encoding apparatus may encode the affine candidate index indicating the selected candidate among the affine candidates. The affine candidate index may indicate the one affine candidate among the affine candidates included in the affine merge candidate list for the current block.

The encoding apparatus encodes image information including prediction information on the current block (S1220). The encoding apparatus may output image information including information on the current block in the form of a bitstream. The encoding apparatus may encode the image information, the image information may include prediction information for the current block, and the prediction information may include the affine candidate index.

As described above, the affine candidate index may indicate the selected affine candidate among the affine candidates included in the affine merge candidate list for the current block.

Meanwhile, as an example, the encoding apparatus may derive prediction samples for the current block based on the CPMVs, derive a residual sample for the current block based on the original sample and the prediction sample for the current block, generate information on the residual for the current block based on the residual sample, and encode information on the residual. The image information may include the information on the residual.

Meanwhile, the bitstream may be transmitted to the decoding apparatus through a network or a (digital) storage medium. The network may include a broadcasting network and/or a communication network, and the digital storage medium may include various storage mediums such as USB, SD, CD, DVD, Blu-ray, HDD, SSD, and the like.

Figure 13:
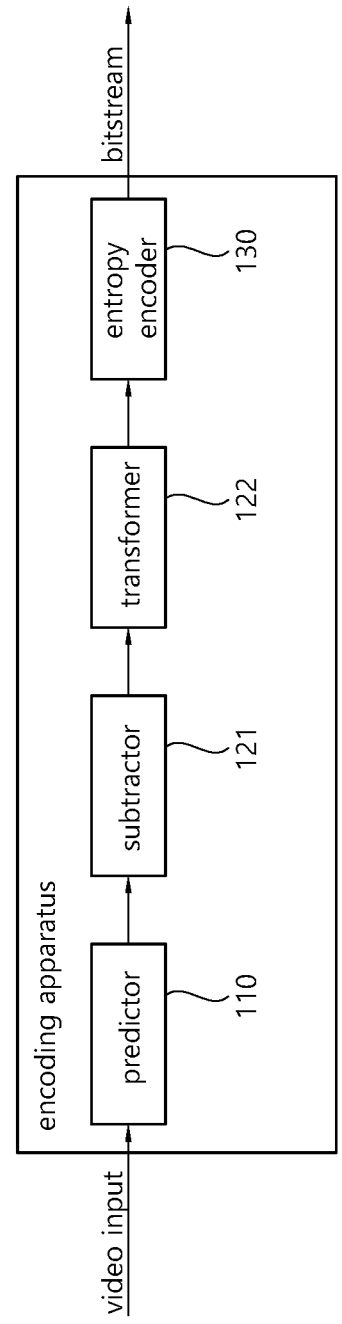
FIG. 13 schematically illustrates an encoding apparatus for performing an image encoding method according to the present disclosure.

FIG. 13 illustrates an encoding apparatus for performing an image encoding method according to the present disclosure. The method disclosed in FIG. 12 may be performed by the encoding apparatus disclosed in FIG. 13. Specifically, for example, the predictor of the encoding apparatus of FIG. 13 may perform S1200 to S1210 of FIG. 12, and the entropy-encoder of the encoding apparatus of FIG. 13 may perform S1220 of FIG. 12. In addition, although not shown, the process of deriving prediction samples for the current block based on the CPMVs may be performed by the predictor of the encoding apparatus of FIG. 21, the process of deriving a residual sample for the current block based on the original sample and a prediction sample for the current block may be performed by the subtractor of the encoding apparatus of FIG. 13, the process of generating information on the residual for the current block based on the residual sample may be performed by the transformer of the encoding apparatus of FIG. 13, and the process of encoding the information on the residual may be performed by the entropy-encoder of the encoding apparatus of FIG. 13.

Figure 14:
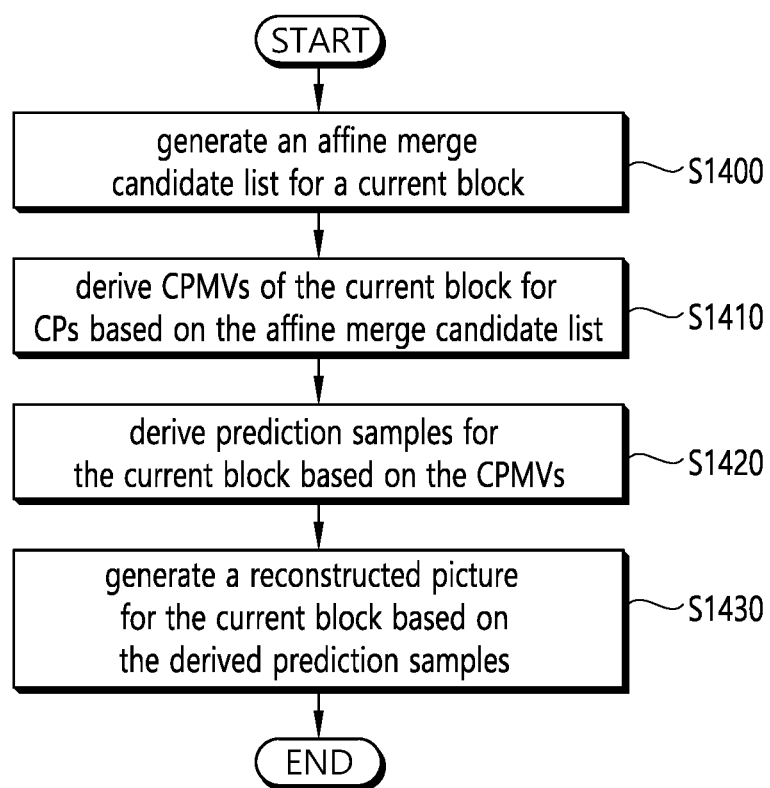
FIG. 14 schematically illustrates an image decoding method by a decoding apparatus according to the present disclosure.

FIG. 14 illustrates an image decoding method by a decoding apparatus according to the present disclosure. The method disclosed in FIG. 14 may be performed by the decoding apparatus disclosed in FIG. 2. Specifically, for example, steps S1400 to S1420 of FIG. 14 may be performed by the predictor of the decoding apparatus, and step S1430 may be performed by the adder of the decoding apparatus. In addition, although not shown, the process of obtaining image information including information on the residual of the current block and/or the prediction information through the bitstream may be performed by an entropy decoder of the decoding apparatus, and the process of deriving the residual sample for the current block based on the information on the residual may be performed by the inverse transformer of the decoding apparatus.

The decoding apparatus constructs an affiliate merge candidate list for the current block (S1400). The decoding apparatus may construct an affine merge candidate list including candidates for the current block. The candidates may include inherited affine candidates and constructed affine candidates.

For example, the inherited affine candidates may be derived based on neighboring blocks of the current block, and a maximum number of inherited affine candidates may be 2. For example, the inherited affine candidates may include a first inherited affine candidate and a second inherited affine candidate.

Specifically, the first inherited affine candidate may be derived based on a left block group including a bottom-left corner neighboring block and a left neighboring block of the current block. For example, neighboring blocks in the left block group may be checked in a first order, and the first inherited affine candidate may be derived based on a neighboring block coded with the first checked affine motion model. Here, the first order may be an order from the bottom left corner neighboring block to the left neighboring block.

In addition, the second inherited affine candidate may be derived based on a top block group including a top-right corner neighboring block, a top neighboring block, and a top-left corner neighboring block of the current block. For example, the neighboring blocks in the top block group may be checked in a second order, and the second inherited affine candidate may be derived based on a neighboring block coded with the first checked affine motion model. Here, the second order may be an order from the top right corner neighboring block to the top neighboring block and the top left corner neighboring block.

Meanwhile, when the size is W×H and an x component of the top-left sample position of the current block is 0 and a y component thereof is 0, the bottom left corner neighboring block may be a block including a sample of coordinates (−1, H), the left neighboring block may be a block including a sample of coordinates (−1, H−1), the top right corner neighboring block may be a block including a sample of coordinates (W, −1), the top neighboring block may be a block including a sample of coordinates (W−1, −1), and the top left corner neighboring block may be a block including a sample of coordinates (−1, −1). That is, the left neighboring block may be a left neighboring block positioned at the lowermost among the left neighboring blocks of the current block, and the top neighboring block may be a top neighboring block positioned at the leftmost among the top neighboring blocks of the current block.

Alternatively, for example, the inherited affine candidate may be derived based on a neighboring block of the current block, and a maximum number of inherited affine candidates may be 1.

Specifically, for example, the neighboring blocks may be checked in a specific order, and the inherited affine candidate may be derived based on a neighboring block coded with a first checked affine motion model. Here, the neighboring blocks may include a left neighboring block, a top neighboring block, a bottom left corner neighboring block, a top right corner neighboring block, and a top left corner neighboring block of the current block. The specific order may be an order from the left neighboring block to the top neighboring block, the bottom left corner neighboring block, the top right corner neighboring block, and the top left corner neighboring block.

Meanwhile, when the size is W×H and an x component of the top-left sample position of the current block is 0 and a y component thereof is 0, the bottom left corner neighboring block may be a block including a sample of coordinates (−1, H), the left neighboring block may be a block including a sample of coordinates (−1, H−1), the top right corner neighboring block may be a block including a sample of coordinates (W, −1), the top neighboring block may be a block including a sample of coordinates (W−1, −1), and the top left corner neighboring block may be a block including a sample of coordinates (−1, −1). That is, the left neighboring block may be a left neighboring block positioned at the lowermost among the left neighboring blocks of the current block, and the top neighboring block may be a top neighboring block positioned at the leftmost among the top neighboring blocks of the current block.

Alternatively, for example, the inherited affine candidates may be derived based on neighboring blocks of the current block, and reference picture indices of the inherited affine candidates may represent different reference pictures. For example, the neighboring blocks may be checked in a specific order, and a first inherited affine candidate may be derived based on the first neighboring block coded with the affine motion model. Thereafter, when the reference picture index of the second neighboring block coded with the affine motion model following the first neighboring block in the specific order represents a reference picture different from the reference picture index of the first neighboring block, the second inherited affine candidate may be derived based on the second neighboring block. If the reference picture index of the second neighboring block represents the same reference picture as the reference picture index of the first neighboring block, an inherited affine candidate may not be derived based on the second neighboring block.

Also, as an example, the constructed affine candidates may be derived based on the neighboring blocks of the current block.

For example, candidate motion vectors for CPs of the current block may be derived based on the neighboring blocks. Here, the CPs may include CP0, CP1, and CP2. The CP0 may represent a top left position of the current block, the CP1 may represent a top right position of the current block, and the CP2 may represent a bottom left position of the current block. In addition, the neighboring blocks may include a neighboring block A, a neighboring block B, a neighboring block C, a neighboring block D, a neighboring block E, a neighboring block F, and a neighboring block G of the current block. When the size of the current block is W×H and the x component of the top-left sample position of the current block is 0 and they component thereof is 0, the neighboring block A may be a block including a sample of coordinates (−1, −1), the neighboring block B may be a block including a sample of coordinates (0, −1), the neighboring block C may be a block including a sample of coordinates (−1, 0), the neighboring block D may be a block including a sample of coordinates (W−1, −1), the neighboring block E may be a block including a sample of coordinates (W, −1), the neighboring block F may be a block including a sample of coordinates (−1, H−1), and the neighboring block G may be a block including a sample of coordinates (−1, H). That is, the neighboring block A may be a top left corner neighboring block of the current block, the neighboring block B may be a top neighboring block positioned at the leftmost among the top neighboring blocks of the current block, the neighboring block C may be a left neighboring block positioned at the uppermost among the left neighboring blocks of the current block, the neighboring block D may be a top neighboring block positioned at the rightmost among the top neighboring blocks of the current block, and the neighboring block E may be a top right corner neighboring block of the current block, the neighboring block F may be a left neighboring block positioned at the lowermost among the left neighboring blocks of the current block, and the neighboring block G may be a bottom left corner neighboring block of the current block.

Specifically, for example, whether neighboring blocks in the first group are avaliable in a first order may be checked, and a motion vector of the first neighboring block first checked as being available may be derived as a candidate motion vector for CP0. That is, the candidate motion vector for the CP0 may be derived as the motion vector of the first neighboring block first identified as being available by checking whether the neighboring blocks in the first group are available in the first order. The availability may indicate that the neighboring block is coded by inter prediction. That is, the available neighboring block may be a block to which inter prediction is applied. Here, for example, the first group may include the neighboring block A, the neighboring block B, and the neighboring block C. The first order may be an order from the neighboring block A to the neighboring block B and the neighboring block C in the first group. For example, when the neighboring block A is available, the motion vector of the neighboring block A may be derived as a candidate motion vector for the CP0. When the neighboring block A is not available and the neighboring block B is available, a motion vector of the neighboring block B may be derived as a candidate motion vector for the CP0. When the neighboring block A and the neighboring block B are not available and the neighboring block C is available, a motion vector of the neighboring block C may be derived as a candidate motion vector for the CP0.

Further, for example, whether neighboring blocks in the second group are available in a second order may be checked, and a motion vector of the second neighboring block first checked as being available may be derived as a candidate motion vector for CP1. That is, the candidate motion vector for the CP1 may be derived as the motion vector of the second neighboring block first identified as being available by checking whether the neighboring blocks in the second group are available in the second order. The availability may indicate that the neighboring block is coded by inter prediction. That is, the available neighboring block may be a block to which inter prediction is applied. Here, the second group may include the neighboring block D and the neighboring block E. The second order may be an order from the neighboring block D to the neighboring block E in the second group. For example, when the neighboring block D is available, the motion vector of the neighboring block D may be derived as a candidate motion vector for the CP1. When the neighboring block D is not available and the neighboring block E is available, a motion vector of the neighboring block E may be derived as a candidate motion vector for the CP1.

Further, for example, whether neighboring blocks in third second group are available in a third order may be checked, and a motion vector of the second neighboring block first checked as being available may be derived as a candidate motion vector for CP2. That is, the candidate motion vector for the CP2 may be derived as the motion vector of the third neighboring block first identified as being available by checking whether the neighboring blocks in the third group are available in the third order. The availability may indicate that the neighboring block is coded by inter prediction. That is, the available neighboring block may be a block to which inter prediction is applied. Here, the third group may include the neighboring block F and the neighboring block G. The third order may be an order from the neighboring block F to the neighboring block G in the third group. For example, when the neighboring block F is available, the motion vector of the neighboring block F may be derived as a candidate motion vector for the CP2. When the neighboring block F is not available and the neighboring block G is available, a motion vector of the neighboring block G may be derived as a candidate motion vector for the CP2.

Thereafter, the constructed affine candidates may be derived based on candidate motion vectors of the CPs.

For example, when the reference picture for the first neighboring block, the reference picture for the second neighboring block, and the reference picture for the third neighboring block are the same, the constructed affine candidates may include a first constructed affine candidate including the candidate motion vector for the CP1, the candidate motion vector for the CP2, and the candidate motion vector for the CP3. Or, for example, when the reference picture for the first neighboring block, the reference picture for the second neighboring block, and the reference picture for the third neighboring block are the same, the constructed affine candidates may include the first constructed affine candidate and a second constructed affine candidate including the motion candidate motion vector for the CP0 and a candidate motion vector for the CP1. Or, for example, when the reference picture for the first neighboring block, the reference picture for the second neighboring block, and the reference picture for the third neighboring block are the same, the constructed affine candidates may include the first constructed affine candidate, the second constructed affine candidate, and a third constructed affine candidate including the candidate motion vector foo the CP0 and the candidate motion vector for the CP2. Or, for example, when the reference picture for the first neighboring block, the reference picture for the second neighboring block, and the reference picture for the third neighboring block are the same, the constructed affine candidates may include the first constructed affine candidate, the second constructed affine candidate, the third constructed affine candidate, and a fourth constructed affine candidate including the candidate motion vector for the CP1 and the candidate motion vector for the CP2.

Further, for example, when the reference picture for the first neighboring block and the reference picture for the second neighboring block are the same, the constructed affine candidates may include the second constructed affine candidate including the candidate motion vector for the CP0 and the candidate motion vector for the CP1.

Further, for example, when the reference picture for the first neighboring block and the reference picture for the third neighboring block are the same, the constructed affine candidates may include the third constructed affine candidate including the candidate motion vector for the CP0 and the candidate motion vector for the CP2.

Further, for example, when the reference picture for the second neighboring block and the reference picture for the third neighboring block are the same, the constructed affine candidates may include the fourth constructed affine candidate including the candidate motion vector for the CP1 and the candidate motion vector for the CP2.

In addition, when the number of inherited affine candidates and constructed affine candidates is smaller than the maximum candidate number of the affine merge candidate list, that is, when the number of derived affine candidates is smaller than the maximum number of candidates, the affine merge candidate list may include a zero candidate. The zero candidate may include candidate motion vectors having a value of zero for the CPs and a reference picture index having a value of zero. Or, for example, when the number of derived candidates is smaller than the maximum candidate number, a first zero candidate, a second zero candidate, a third zero candidate, . . . , an nth zero candidate may be added in this order to the affine merge candidate list until the number of affine candidates of the affine merge candidate list reaches the maximum number of candidates. For example, the first zero candidate may include candidate motion vectors having a value of 0, an L0 (list 0) reference picture index having a value of 0, and a L1 (list 1) reference picture index having a value of 0, the second zero candidate may include candidate motion vectors having a value of 0, an L0 reference picture index having a value of 0, and a L1 reference picture index having a value of 1, the third zero candidate may include candidate motion vectors having a value of 0, an L0 reference picture index having a value of 1, and a L1 reference picture index having a value of 0, and the fourth zero candidate may include candidate motion vectors having a value of 0, an L0 reference picture index having a value of 1, and a L1 reference picture index having a value of 1. Or, for example, the reference picture indices of the neighboring block A, the neighboring block B, the neighboring block C, the neighboring block D, the neighboring block E, the neighboring block F, and the neighboring block G may be included in the first zero candidate to the nth zero candidate in order of higher frequency. Alternatively, for example, the first zero candidate may include candidate motion vectors having a value of 0 and a reference picture index having the same value as a reference picture index of the left neighboring block of the current block, the second zero candidate may include the candidate motion vectors having a value of 0 and a reference picture index having the same value as a reference picture index of the top neighboring block of the current block, the third zero candidate may include the candidate motion vectors having a value of 0 and a reference picture index having the same value as a reference picture index of the bottom left corner neighboring block of the current block, the fourth zero candidate may include the candidate motion vectors having a value of 0 and a reference picture index having the same value as a reference picture index of the top right corner neighboring block of the current block, and the fifth zero candidate may include candidate motion vectors having a value of 0 and a reference picture index having the same value as a reference picture index of the top left corner neighboring block of the current block.

The decoding apparatus derives CPMVs (Control Point Motion Vectors) for CPs of the current block based on the affine merge candidate list (S1410).

The decoding apparatus may select one of the affine candidates included in the affine merge candidate list, and derive the CPMVs of the current block for the CPs based on the selected affine MVP candidate.

For example, the decoding apparatus may obtain an affine candidate index for the current block from a bitstream and derive CPMVs of the current block for the CPs based on an affine candidate indicated by the affine candidate index among the affine candidates included in the affine merge candidate list. The decoding apparatus may obtain image information from the bitstream, and the image information may include prediction information on the current block. The prediction information may include the affine candidate index.

Specifically, when the affine candidate includes a candidate motion vector for the CP0 and a candidate motion vector for the CP1, the candidate motion vector of the affine candidate for the CP0 may be derived as the CPMV of the CP0 and the candidate motion vector of the affine candidate for the CP1 may be derived as the CPMV of the CP1. In addition, when the affine candidate includes a candidate motion vector for the CP0, a candidate motion vector for the CP1, and a candidate motion vector for the CP2, the candidate motion vector of the candidate for the CP0 may be derived as the CPMV of the CP0, the candidate motion vector of the affine candidate for the CP1 may be derived as the CPMV of the CP1 the candidate motion vector of the affine candidate for the CP2 may be derived as the CPMV of the CP2. In addition, when the affine candidate includes a candidate motion vector for CP0 and a candidate motion vector for CP2, the candidate motion vector of the affine candidate for CP0 may be derived as the CPMV of the CP0 and the candidate motion vector of the affine candidate for CP2 may be derived as the CPMV of the CP2.

The decoding apparatus drives prediction samples for the current block based on the CPMVs (S1420). The decoding apparatus may derive motion vectors of the current block in the sub-block unit or the sample unit based on the CPMVs. That is, the decoding apparatus may derive a motion vector of each sub block or each sample of the current block based on the CPMVs. The motion vectors in the sub-block unit or the sample unit may be derived based on Equation 1 or Equation 3 described above. The motion vectors may be referred to as an affine motion vector field (MVF) or a motion vector array.

The decoding apparatus may derive prediction samples for the current block based on the motion vectors of the sub-block unit or the sample unit. The decoding apparatus may derive a reference region in a reference picture based on the motion vector of the sub-block unit or the sample unit, and generate a prediction sample of the current block based on a reconstructed sample in the reference region.

The decoding apparatus generates a reconstructed picture for the current block based on the derived prediction samples (S1430). The decoding apparatus may generate a reconstructed picture for the current block based on the derived prediction samples. The decoding apparatus may directly use the prediction sample as a reconstructed sample or generate a reconstructed sample by adding a residual sample to the prediction sample according to a prediction mode. If there is a residual sample for the current block, the decoding apparatus may obtain image information including information on the residual for the current block from the bitstream. The information on the residual may include a transform coefficient regarding the residual sample. The decoding apparatus may derive the residual sample (or residual sample array) for the current block based on the information on the residual. The decoding apparatus may generate a reconstructed sample based on the prediction sample and the residual sample, and may derive a reconstructed block or a reconstructed picture based on the reconstructed sample. Thereafter, as described above, the decoding apparatus may apply an in-loop filtering procedure, such as a deblocking filtering and/or SAO procedure, to the reconstructed picture in order to improve subjective/objective picture quality as necessary.

Figure 15:
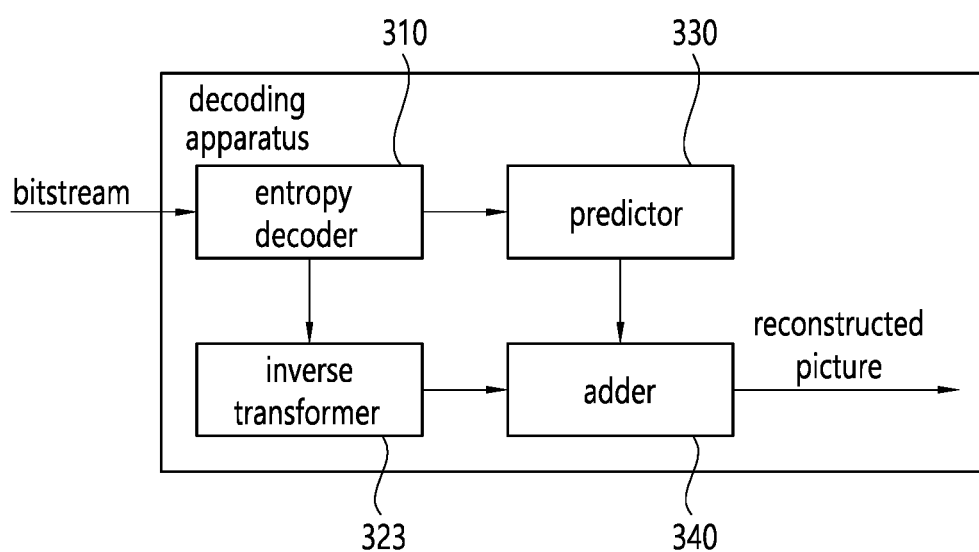
FIG. 15 schematically illustrates a decoding apparatus for performing an image decoding method according to the present disclosure.

FIG. 15 illustrates a decoding apparatus for performing an image decoding method according to the present disclosure. The method disclosed in FIG. 14 may be performed by the decoding apparatus disclosed in FIG. 15. Specifically, for example, the predictor of the decoding apparatus of FIG. 15 may perform steps S1400 to S1420 of FIG. 14, and the adder of the decoding apparatus of FIG. 15 may perform step S1430 of FIG. 14. In addition, although not shown, a process of obtaining image information including information on the residual of the current block and/or prediction information through a bitstream may be performed by the entropy decoder of the decoding apparatus of FIG. 15 and a process of deriving the residual sample for the current block based on the residual information may be performed by the inverse transformer of the decoding apparatus of FIG. 15.

According to the present disclosure described above, calculation complexity of the affine merge mode may be reduced, thereby improving overall video coding efficiency.

Further, according to the present disclosure, in deriving the affine merge candidate list, the maximum number of inherited affine candidates may be set to 2 and one inherited affine candidate in each of the left block group and the top block group may be derived, thereby reducing calculation complexity and improving coding efficiency in the process of deriving inherited affine candidates and constructing the affine merge candidate list.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

The embodiments described in this document may be implemented and performed on a processor, a microprocessor, a controller, or a chip. For example, the functional units shown in each drawing may be implemented and performed on a computer, processor, microprocessor, controller, or chip. In this case, information (e.g., information on instructions) or an algorithm for implementation may be stored in a digital storage medium.

In addition, the decoding apparatus and the encoding apparatus to which the present disclosure is applied can be applied to multimedia communication devices such as a multimedia broadcasting transmitting and receiving device, a mobile communication terminal, a home cinema video device, a digital cinema video device, a surveillance camera, a video chatting device, (3D) video devices, video telephony video devices, and medical video devices, and the like, which may be included in, for example, a storage medium, a camcorder, a video on demand (VoD) service provision device, an OTT video (Over the top video), an Internet streamlining service providing device, a 3D video device, a video call device, a transportation means terminal (e.g., vehicle terminal, airplane terminal, ship terminal, etc.) and may be used to process video signals or data signals. For example, the OTT video (over the top video) device may include a game console, a Blu-ray player, an Internet access TV, a home theater system, a smartphone, a tablet PC, a DVR (Digital Video Recorder).

Further, the processing method to which the present disclosure is applied may be produced in the form of a computer-executed program, and may be stored in a computer-readable recording medium. The multimedia data having the data structure according to the present disclosure can also be stored in a computer-readable recording medium. The computer-readable recording medium includes all kinds of storage devices and distributed storage devices in which computer-readable data is stored. The computer-readable recording medium may be, for example, a Blu-ray Disc (BD), a Universal Serial Bus (USB), a ROM, a PROM, an EPROM, an EEPROM, a RAM, a CD-Data storage devices. In addition, the computer-readable recording medium includes media implemented in the form of a carrier wave (for example, transmission over the Internet). In addition, the bit stream generated by the encoding method can be stored in a computer-readable recording medium or transmitted over a wired or wireless communication network.

Further, an embodiment of the present disclosure may be implemented as a computer program product by program code, and the program code may be executed in a computer according to an embodiment of the present disclosure. The program code may be stored on a carrier readable by a computer.

Figure 16:
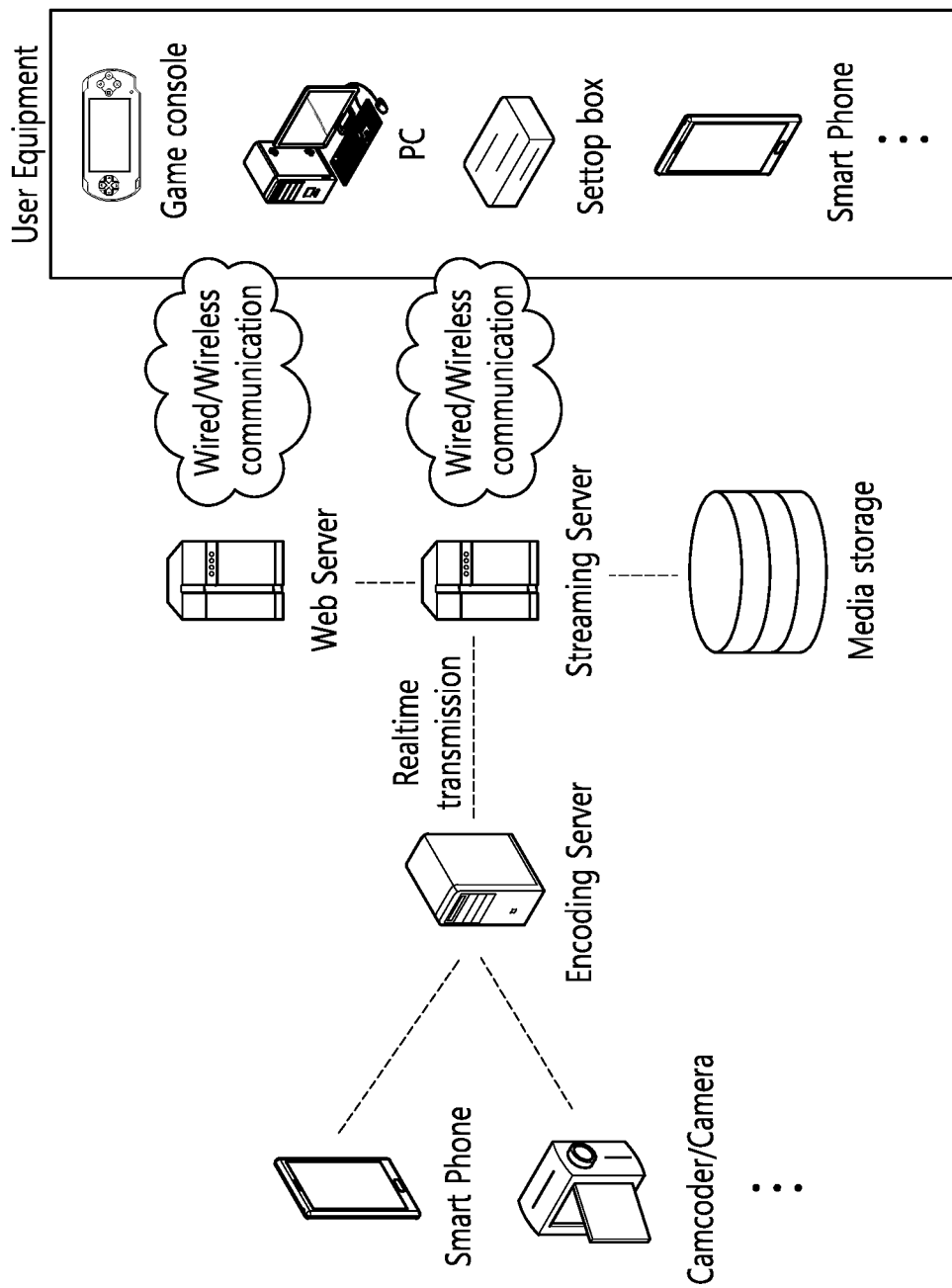
FIG. 16 illustrates an example of a structure of a content streaming system to which the present disclosure is applied.

FIG. 16 illustrates a content streaming system structure to which the present disclosure is applied.

A content streaming system to which the present disclosure is applied may include an encoding server, a streaming server, a web server, a media storage, a user device, and a multimedia input device.

The encoding server compresses content input from multimedia input devices such as smartphones, cameras, camcorders, etc. Into digital data to generate a bitstream and transmit the bitstream to the streaming server. As another example, when multimedia input devices such as smartphones, cameras, camcorders, etc. directly generate a bitstream, the encoding server may be omitted.

The bitstream may be generated by an encoding method or a bitstream generating method to which the present disclosure is applied, and the streaming server may temporarily store the bitstream in the process of transmitting or receiving the bitstream.

The streaming server transmits multimedia data to the user device based on a user request through the web server, and the web server serves as an intermediary for informing the user of what services are provided. When a user requests a desired service from the web server, the web server delivers it to a streaming server, and the streaming server transmits multimedia data to the user. Here, the content streaming system may include a separate control server, and in this case, the control server controls a command/response between devices in the content streaming system.

The streaming server may receive content from a media repository and/or an encoding server. For example, when content is received from the encoding server, the content may be received in real time. In this case, in order to provide a smooth streaming service, the streaming server may store the bitstream for a predetermined time.

Examples of the user device include a mobile phone, a smartphone, a laptop computer, a digital broadcasting terminal, a personal digital assistant (PDA), a portable multimedia player (PMP), a navigation device, and a slate PC, a tablet PC, ultrabook, a wearable device (e.g., smartwatch, glass glasses, head mounted display), a digital TV, a desktop computer, a digital signage, and so on. Each server in the content streaming system may operate as a distributed server, and in this case, data received from each server may be processed in a distributed manner.

What is claimed is:

1. An image decoding method, by a decoding apparatus, comprising:
constructing a merge candidate list for deriving motion information of subblock units of a current block, wherein the merge candidate list includes inherited affine candidates and constructed affine candidates;
deriving control point motion vectors (CPMVs) of a selected affine candidate in the merge candidate list as CPMVs for control points (CPs) of the current block;
deriving prediction samples for the current block based on the CPMVs for the CPs; and
generating a reconstructed picture for the current block based on the derived prediction samples,
wherein a maximum number of the inherited affine candidates is 2,
wherein a first inherited affine candidate is derived from a left block group including a bottom-left corner neighboring block and a left neighboring block of the current block,
wherein a second inherited affine candidate is derived from a top block group including a top-right corner neighboring block, a top neighboring block and a top-left corner neighboring block of the current block,
wherein the CPs include a CP0, a CP1, and a CP2,
wherein the CP0 is a point at a top left position of the current block, the CP1 is a point at a top right position of the current block, and the CP2 is a point at a bottom left position of the current block,
wherein the first inherited affine candidate is derived based on a neighboring block first checked as coded by an affine motion model in the left block group, neighboring blocks in the left block group are checked in a first order, and the first order is an order from the bottom left corner neighboring block to the left neighboring block, and
wherein the second inherited affine candidate is derived based on a neighboring block first checked as coded by the affine motion model in the top block group, neighboring blocks in the top block group is checked in a second order, and the second order is an order from the top right corner neighboring block, to the top neighboring block, and to the bottom left corner neighboring block.

2. The image decoding method of claim 1, wherein candidate motion vectors for the CPs are derived based on neighboring blocks of the current block, and
the constructed affine candidates are derived based on the candidate motion vectors for the CPs.

3. The image decoding method of claim 1, wherein the merge candidate list comprises a zero candidate when a number of the inherited affine candidates and the constructed affine candidates is smaller than a maximum candidate number of the merge candidate list, and
the zero candidate comprises candidate motion vectors having a value of 0 and a reference picture index having a value of 0.

4. An image encoding method, by an encoding apparatus, comprising:
constructing a merge candidate list for deriving motion information of subblock units of a current block, wherein the merge candidate list includes inherited affine candidates and constructed affine candidates;
deriving control point motion vectors (CPMVs) of a selected affine candidate in the merge candidate list as CPMVs for control points (CPs) of the current block; and
encoding image information including prediction information for the current block,
wherein a maximum number of the inherited affine candidates is 2,
wherein a first inherited affine candidate is derived from a left block group including a bottom-left corner neighboring block and a left neighboring block,
wherein a second inherited affine candidate is derived from a top block group including a top-right corner neighboring block, a top neighboring block and a top-left corner neighboring block,
wherein the CPs include a CP0, a CP1, and a CP2,
wherein the CP0 is a point at a top left position of the current block, the CP1 is a point at a top right position of the current block, and the CP2 is a point at a bottom left position of the current block,
wherein the first inherited affine candidate is derived based on a neighboring block first checked as coded by an affine motion model in the left block group, neighboring blocks in the left block group are checked in a first order, and the first order is an order from the bottom left corner neighboring block to the left neighboring block, and
wherein the second inherited affine candidate is derived based on a neighboring block first checked as coded by the affine motion model in the top block group, neighboring blocks in the top block group is checked in a second order, and the second order is an order from the top right corner neighboring block, to the top neighboring block, and to the bottom left corner neighboring block.

5. A non-transitory computer-readable storage medium storing a bitstream generated by a method, the method comprising:
constructing a merge candidate list for deriving motion information of subblock units of a current block, wherein the merge candidate list includes inherited affine candidates and constructed affine candidates;
deriving control point motion vectors (CPMVs) of a selected affine candidate in the merge candidate list as CPMVs for control points (CPs) of the current block;
encoding image information including prediction information for the current block; and
generating the bitstream including the image information,
wherein a maximum number of the inherited affine candidates is 2,
wherein a first inherited affine candidate is derived from a left block group including a bottom-left corner neighboring block and a left neighboring block,
wherein a second inherited affine candidate is derived from a top block group including a top-right corner neighboring block, a top neighboring block and a top-left corner neighboring block,
wherein the CPs include a CP0, a CP1, and a CP2,
wherein the CP0 is a point at a top left position of the current block, the CP1 is a point at a top right position of the current block, and the CP2 is a point at a bottom left position of the current block,
wherein the first inherited affine candidate is derived based on a neighboring block first checked as coded by an affine motion model in the left block group, neighboring blocks in the left block group are checked in a first order, and the first order is an order from the bottom left corner neighboring block to the left neighboring block, and wherein the second inherited affine candidate is derived based on a neighboring block first checked as coded by the affine motion model in the top block group, neighboring blocks in the top block group is checked in a second order, and the second order is an order from the top right corner neighboring block, to the top neighboring block, and to the bottom left corner neighboring block.

* * * * *